(12) United States Patent
Shimomae

(10) Patent No.: US 8,028,306 B2
(45) Date of Patent: Sep. 27, 2011

(54) DISK STORAGE MEDIUM PROCESSING APPARATUS

(75) Inventor: Katsuro Shimomae, Tokyo (JP)

(73) Assignee: Tohei Industrial Co., Ltd., Ishikawa-Cho, Ishikawa-Gun, Fukushima (JP)

( * ) Notice: Subject to any disclaimer, the term of this patent is extended or adjusted under 35 U.S.C. 154(b) by 0 days.

(21) Appl. No.: 12/656,375

(22) Filed: Jan. 28, 2010

(65) Prior Publication Data

US 2010/0138850 A1 Jun. 3, 2010

Related U.S. Application Data

(63) Continuation of application No. 11/347,386, filed on Feb. 6, 2006, now Pat. No. 7,853,963.

(30) Foreign Application Priority Data

| Feb. 23, 2005 | (JP) | 2005-047019 |
| Feb. 23, 2005 | (JP) | 2005-047020 |
| Feb. 23, 2005 | (JP) | 2005-047021 |
| Feb. 23, 2005 | (JP) | 2005-047022 |
| Feb. 23, 2005 | (JP) | 2005-047023 |
| Feb. 28, 2005 | (JP) | 2005-053353 |
| Jun. 16, 2005 | (JP) | 2005-176365 |

(51) Int. Cl.
*G11B 17/04* (2006.01)
(52) U.S. Cl. .......................... 720/623; 720/626
(58) Field of Classification Search .......... 720/620–623, 720/626, 645
See application file for complete search history.

(56) References Cited

U.S. PATENT DOCUMENTS

| 2005/0050563 A1* | 3/2005 | Hirano et al. | 720/621 |
| 2005/0050564 A1* | 3/2005 | Araki | 720/623 |
| 2005/0160439 A1* | 7/2005 | Inoue | 720/621 |

* cited by examiner

*Primary Examiner* — Daniell L Negron
*Assistant Examiner* — Adam B Dravininkas
(74) *Attorney, Agent, or Firm* — Manabu Kanesaka

(57) ABSTRACT

A disk storage medium processing apparatus includes a disk conveying device for conveying a disk between a disk loading/unloading slot of an apparatus body and a centering position of a traverse unit. The disk conveying device includes a pair of first and second disk guide arms which are pivotably disposed on the apparatus body and which can hold the periphery of the disk to convey the disk. Therefore, the disk storage medium processing apparatus can easily and flexibly conduct the control for conveyance of the disk no matter whether the disk has a small diameter or a large diameter, with keeping protection of the recording surface of the disk and can be formed more compactly.

7 Claims, 24 Drawing Sheets

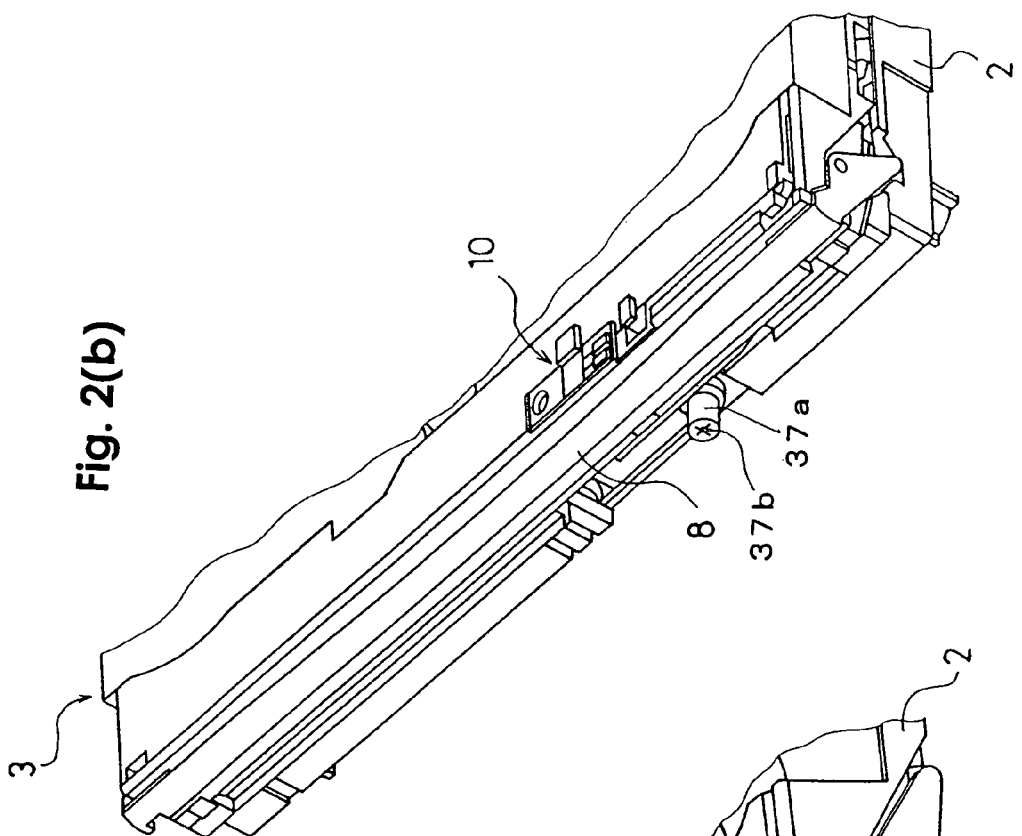
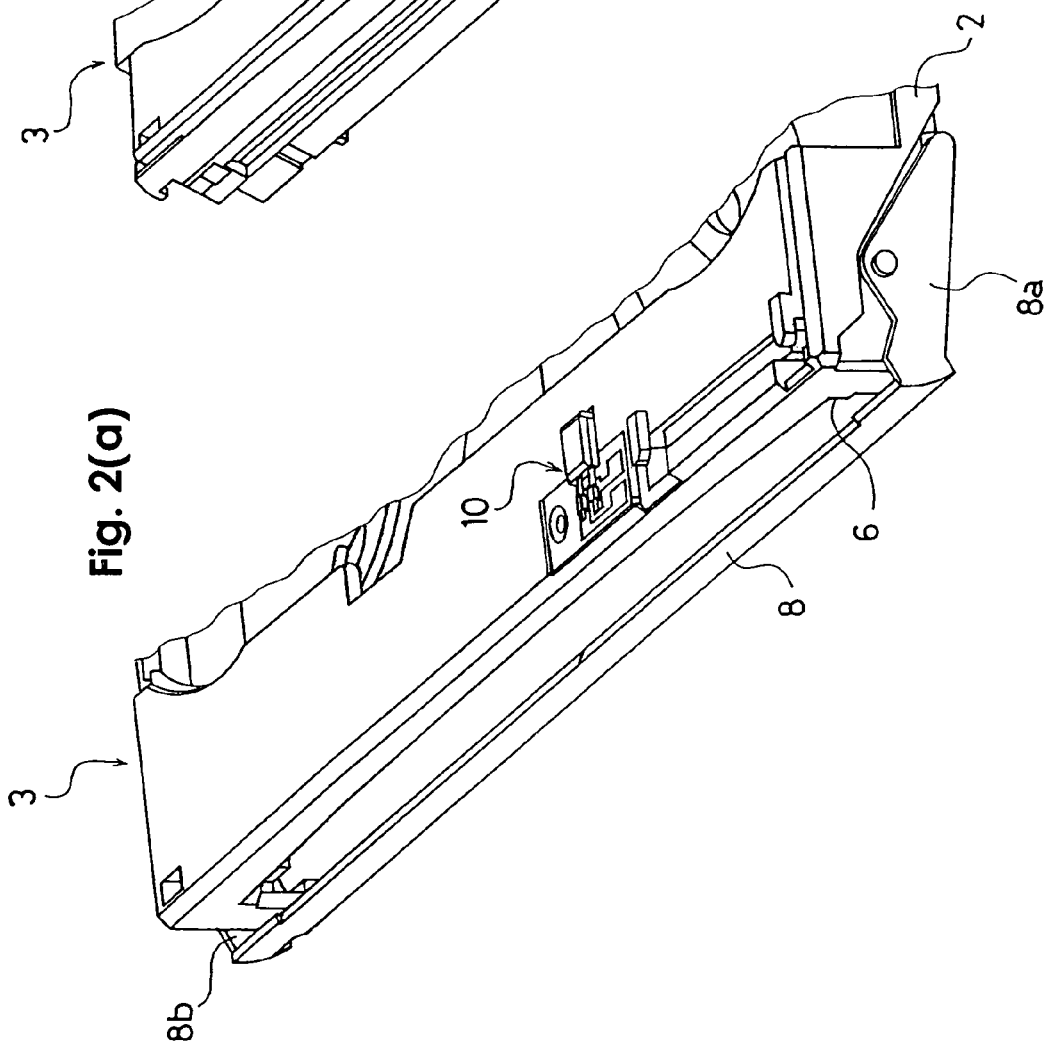

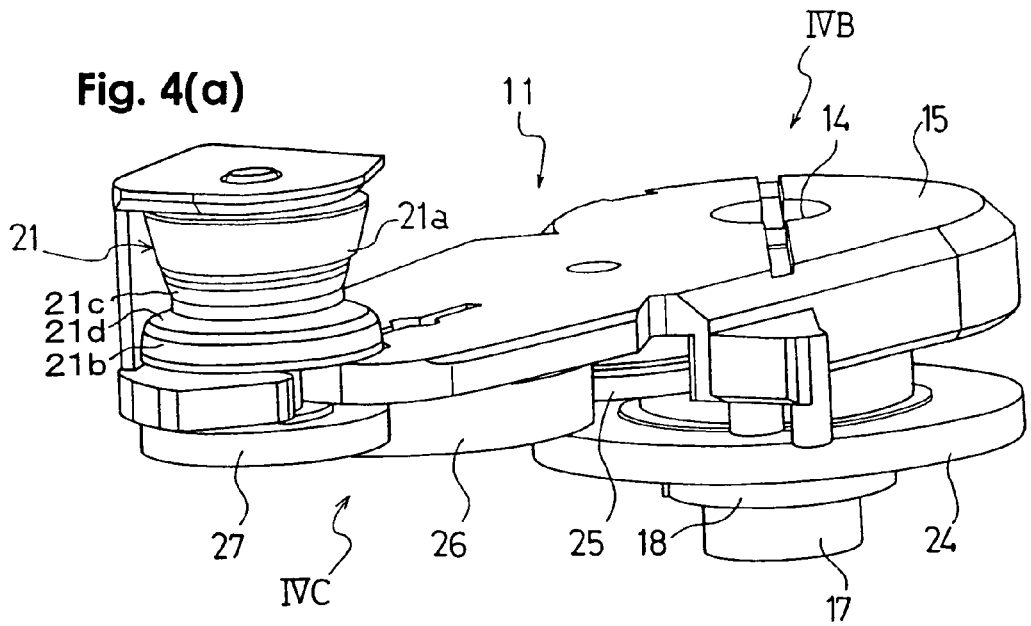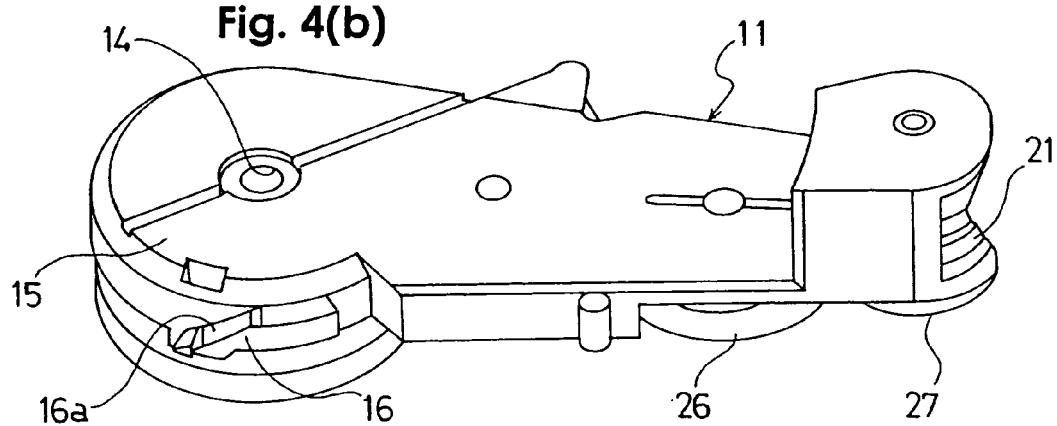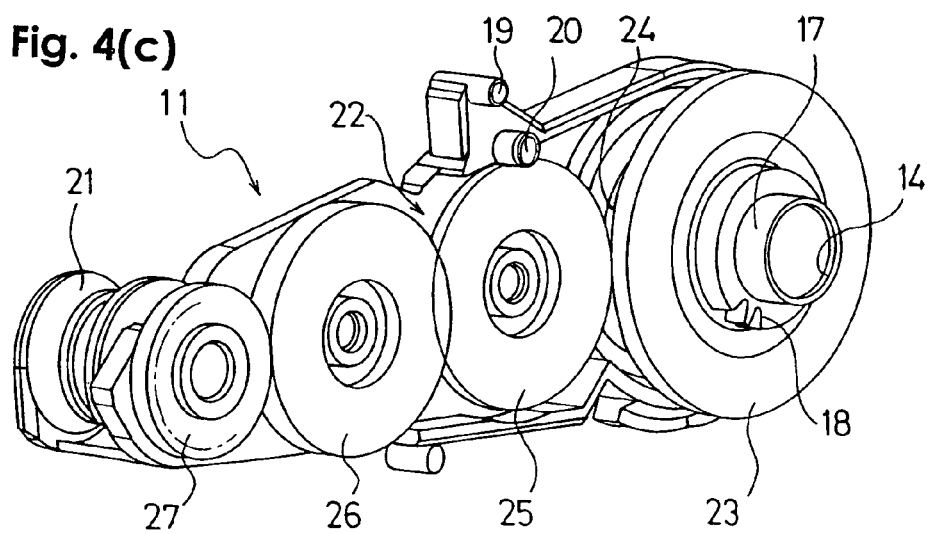

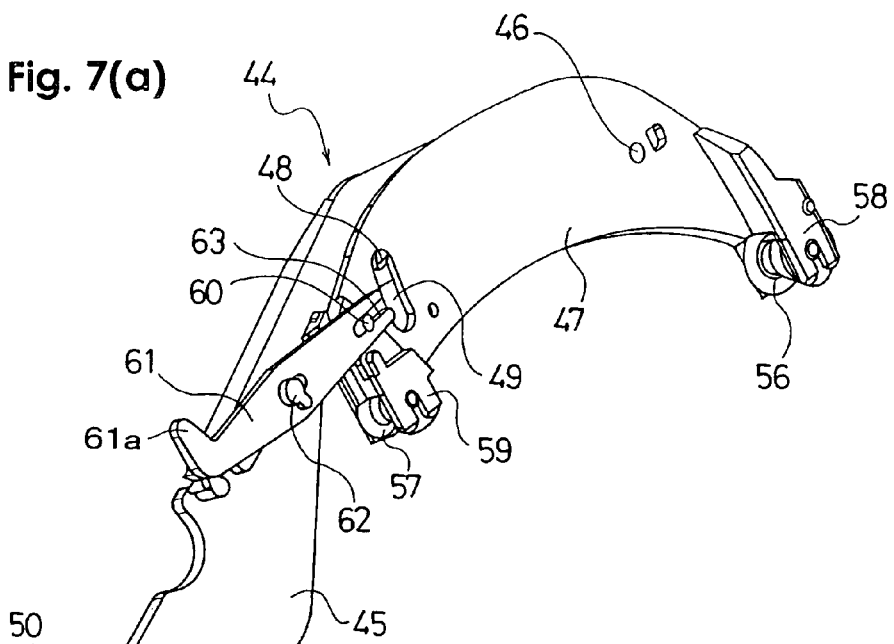
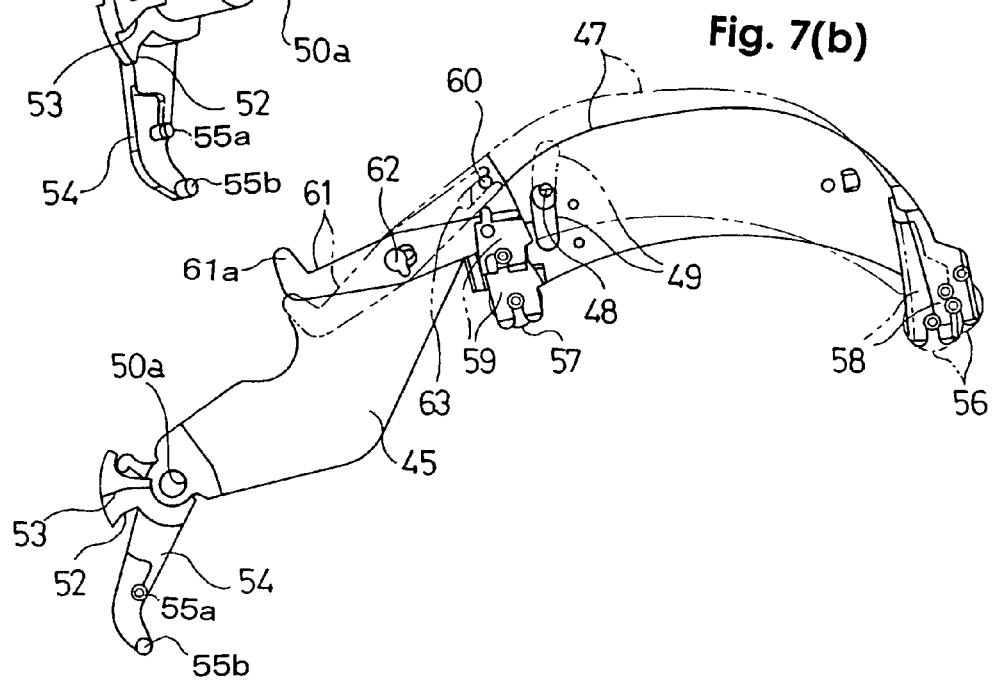

DISK STORAGE MEDIUM PROCESSING APPARATUS

CROSS-REFERENCE TO RELATED APPLICATION

This is a continuation application of Ser. No. 11/347,386 filed on Feb. 6, 2006.

BACKGROUND OF THE INVENTION

The present invention relates to a technical field of a disk storage medium processing apparatus which can be used for audio instruments, image instruments, information instruments, communication instruments, measuring instruments, and the like to record information onto and reproduce information from disks such as CDs or DVDs and, more particularly, to a technical field of a disk storage medium processing apparatus which can hold a disk at the periphery thereof to convey the disk and can be formed compactly.

For example, for audio instruments, many disk recording/reproduction apparatuses of a type using a CD storing a plurality of songs have been conventionally developed. As one of such conventional disk recording/reproduction apparatuses, a disk storage medium processing apparatus has been proposed in Japanese Patent Unexamined Publication No. 2002-334507, which comprises an apparatus body having a disk loading/unloading slot, a traverse unit which is disposed in the apparatus body to conduct at least one of recording, deletion, and reproduction of information onto or from a disk, and a disk conveying means which conveys the disk into the apparatus body when a part of the disk is inserted through the disk loading/unloading slot and which ejects a part of the disk through the disk loading/unloading slot. In the disk storage medium processing apparatus, the disk conveying means comprises at least a first disk conveying arm which is pivotally attached to the apparatus body and which has at its end a driving roller capable of holding the periphery of the disk and a second disk conveying arm which is pivotally attached to the apparatus body and which has at its end a driven roller capable of holding the periphery of the disk, wherein the driving roller is driven to rotate by a motor. The first and second disk conveying arms pivot while the periphery of the disk is held by the driving roller and the driven roller, thereby conveying the disk.

Since only the periphery of the disk is touched by a pair of the driving roller and the driven roller, the conventional disk storage medium processing apparatus can convey the disk without scratching a recording surface of the disk.

In the disk storage medium processing apparatus disclosed in the aforementioned Japanese Patent Unexamined Publication No. 2002-334507, the disk conveying means holds the disk of which a portion is inserted through the disk loading/unloading slot to convey the disk to a store position in the apparatus body and holds the disk at the store position to eject a portion of the disk, not for conveying the disk between the store position and the traverse unit. Therefore, another conveying means is required to convey the disk between the store position and the traverse unit and, in addition, another means for centering the disk relative to the traverse unit is required. Accordingly, the disk storage medium processing apparatus must have complex structure and the increased number of parts. This makes the reduction in size of the apparatus difficult.

Further, since control is required for the conveyance of the disk between the disk loading/unloading slot and the store position, the conveyance of the disk between the store position and the traverse unit, and the centering of the disk relative to the traverse unit, the control for disk conveyance must be complex.

Since the periphery of the disk is held by the driving roller and the driven roller, the disk can be held somehow. Since the disk is held by the two rollers which both rotate, however, it is desired to hold the disk in a more stable state.

SUMMARY OF THE INVENTION

It is an object of the present invention to provide a disk storage medium processing apparatus which achieves easy and flexible control for conveyance of a disk, whether the disk has a large diameter or a small diameter, with keeping protection of a recording surface of the disk and can be formed more compactly.

To achieve the aforementioned object, the present invention provides a disk storage medium processing apparatus comprising: at least an apparatus body having a disk loading/unloading slot; a traverse unit which is disposed in said apparatus body to conduct at least one of recording, deletion, and reproduction of information onto or from a disk; and a disk conveying means which conveys said disk into said apparatus body when a part of said disk is inserted through said disk loading/unloading slot and which ejects a part of said disk through said disk loading/unloading slot from the state that said disk is housed in said apparatus body, wherein said disk conveying means comprises at least a pair of first and second disk conveying arms which are pivotably attached to the apparatus body and which can hold the periphery of said disk to convey said disk, and said first and second disk conveying arms are adapted to hold the periphery of said disk to convey said disk to said traverse unit when a part of said disk is inserted through said disk loading/unloading slot and are adapted to hold the periphery of said disk to convey said disk from said traverse unit to eject a part of said disk through said disk loading/unloading slot.

In the present invention, said first disk conveying arm is provided with a disk driving roller which can hold the periphery of said disk and rotate in directions of withdrawing said disk and of ejecting said disk, and said second disk conveying arm is provided with a disk guide portion which is made of friction material and which can hold the periphery of said disk.

In the present invention, said first disk conveying arm is always biased in such a direction that said disk driving roller comes closer to said disk guide portion of said second disk conveying arm and said second disk conveying arm is always biased in such a direction that said disk guide portion comes closer to said disk driving roller, wherein the biasing force biasing said first disk conveying arm is set to be more than the biasing force biasing said second disk conveying arm.

In the present invention, a clamping portion capable of clamping the periphery of said disk is formed in said disk loading/unloading slot on said second disk conveying arm side.

In the present invention, a gear train for transmitting rotational force to said disk driving roller is arranged on said first disk conveying awl.

The present invention further comprises an arm synchronous means for synchronizing the pivotal movement of said first disk conveying arm and the pivotal movement of said second disk conveying arm with each other.

In the present invention, said disk loading/unloading slot has a disk holding portion for holding said disk.

The present invention further provides a disk storage medium processing apparatus comprising: at least an apparatus body having a disk loading/unloading slot; a traverse unit which is disposed in said apparatus body to conduct at least one of recording, deletion, and reproduction of information onto or from a disk; a disk conveying means which conveys said disk into said apparatus body when a part of said disk is inserted through said disk loading/unloading slot and which ejects a part of said disk through said disk loading/unloading slot from the state that said disk is housed in said apparatus body; and a control means for controlling said disk conveying means, wherein said disk conveying means comprises at least three disk conveying arms, i.e., first through third disk conveying arms which are pivotably attached to the apparatus body and which can hold the periphery of said disk to convey said disk, and said control means comprises a trigger setting means for setting trigger for starting the control of said disk conveying means according to the diameter of said disk.

In the present invention, said trigger setting means sets said trigger according to the amount of pivotal movement of at least one of said first through third disk conveying arms.

In the present invention, a disk diameter discrimination means for discriminating the diameter of said disk is disposed on at least one of said first through third disk conveying arms and said trigger setting means sets the trigger according to the diameter of said disk discriminated by said disk discrimination means.

The present invention also provides a disk storage medium processing apparatus comprising: at least an apparatus body having a disk loading/unloading slot; a traverse unit which is disposed in said apparatus body to conduct at least one of recording, deletion, and reproduction of information onto or from a disk; a clamper supporting means for supporting a clamper which clamps said disk to said traverse unit; a disk conveying means which conveys said disk into said apparatus body when a part of said disk is inserted through said disk loading/unloading slot and which ejects a part of said disk through said disk loading/unloading slot from the state that said disk is housed in said apparatus body; and a control means for controlling said disk conveying means, wherein said disk conveying means comprises at least three disk conveying arms, i.e., first through third disk conveying arms which are pivotably attached to the apparatus body and which can hold the periphery of said disk to convey said disk, at least one of said first through third disk conveying arms has two arm members, i.e., first and second arm members which are connected to each other such that said first and second arm members can move relative to each other to have an angle therebetween, and one of said first and second arm members first holds the periphery of said disk, inserted through said disk loading/unloading slot at one location and, according to the movement of said disk in the inserting direction, pivots relative to the other arm member so as to hold the periphery of said disk at two locations.

In the present invention, the locations where the periphery of said disk is held and which are determined according to the diameter of said disk are determined according to the amount of pivotal movement of the other one of said first and second arm members.

In the present invention, when the other one of said first and second arm members pivots so that the one of said first and second arm members is spaced apart from the periphery of said disk after said disk is clamped by said clamper, the one of said first and second arm members pivots relative to the other one in the reverse direction.

The present invention also provides a disk storage medium processing apparatus comprising: at least an apparatus body having a disk loading/unloading slot; a traverse unit which is disposed in said apparatus body to conduct at least one of recording, deletion, and reproduction of information onto or from a disk; a disk conveying means which conveys said disk into said apparatus body when a part of said disk is inserted through said disk loading/unloading slot and which ejects a part of said disk through said disk loading/unloading slot from the state that said disk is housed in said apparatus body; and a control means for controlling said disk conveying means, wherein said control means comprises a single control member which can conduct a plurality of controls such as the control for conveyance of said disk by said disk conveying means, the control for centering of said disk relative to said traverse unit, and the control for clamping or unclamping said disk relative to a turn table of said traverse unit.

In the present invention, said apparatus body is provided with a shutter for covering said disk loading/unloading slot and said control member also conducts the control of opening or closing said shutter.

In the present invention, said control means comprises a trigger setting means for setting trigger for starting the control of said control member according to the diameter of said disk.

The present invention also provides disk storage medium processing apparatus comprising: at least an apparatus body having a disk loading/unloading slot; a traverse unit which is disposed in said apparatus body to conduct at least one of recording, deletion, and reproduction of information onto or from a disk; a disk conveying means which conveys said disk into said apparatus body when a part of said disk is inserted through said disk loading/unloading slot and which ejects a part of said disk through said disk loading/unloading slot from the state that said disk is housed in said apparatus body; and a control means for controlling said disk conveying means, wherein said disk conveying means comprises at least three disk conveying arms, i.e., first through third disk conveying arm members which are pivotably mounted on said apparatus body and which can hold the periphery of said disk to convey said disk, and at least one of said first through third disk conveying arms is an arm for centering said disk relative to said traverse unit.

In the present invention, the arm for centering said disk relative to said traverse unit has two arm members, i.e., first and second arms which are connected to each other such that said first and second arm members can move relative to each other to have an angle therebetween, and the locations where the periphery of said disk is held by one of said first and second arm members are determined according to the diameter of said disk.

In the present invention, the locations where the periphery of said disk is held and which are determined according to the diameter of said disk are determined according to the amount of pivotal movement of the disk conveying arm composed of said first and second arm members.

The present invention also provides a disk storage medium processing apparatus comprising: at least an apparatus body having a disk loading/unloading slot; a traverse unit which is disposed in said apparatus body to conduct at least one of recording, deletion, and reproduction of information onto or from a disk; a clamper supporting means for supporting a clamper which clamps said disk to said traverse unit; and a disk conveying means which conveys said disk into said apparatus body when a part of said disk is inserted through said disk loading/unloading slot and which ejects a part of said disk through said disk loading/unloading slot from the state that said disk is housed in said apparatus body, wherein said disk conveying means comprises a pair of first and second disk conveying arms which are pivotably attached to the apparatus body and which can hold the periphery of said disk to convey said disk, and further comprises a driving means for generating rotational force, wherein said first disk conveying arm has a disk driving roller which can be rotated by the rotational force of said driving means and said second disk conveying arm has a disk driven roller which is rotatably disposed, and wherein said disk driving roller and said disk driven roller hold the periphery of said disk of which a portion is inserted through said disk loading/unloading slot to convey said disk to the clamper supporting means, and hold the periphery of said disk and rotate to convey said disk said clamper supporting means to eject at least a portion of said disk through said disk loading/unloading slot.

In the present invention, said first disk conveying arm is always biased in such a direction that said disk driving roller comes closer to said disk driven roller of said second disk conveying arm, said second disk conveying arm is always biased in such a direction that said disk driven roller comes closer to said disk driving roller, and the biasing force biasing said first disk conveying arm is set to be more than the biasing force biasing said second disk conveying arm.

In the present invention, at least pinching surfaces of a disk pinching portion of said disk driving roller hold the periphery of said disk intermittently.

In the present invention, the disk pinching portion of said disk driving roller is an elastic member and comprises a pair of pinching surfaces composing said pinching surfaces and a bottom surface between the pair of said pinching surfaces, each of said pinching surfaces is composed of convexities and concavities which are alternately arranged in the circumferential direction to form an uneven curved conical surface, and said bottom surface is composed of convexities and concavities which are alternately arranged in the circumferential direction to form an uneven surface parallel to the rotary shaft of said disk driving roller, and each pair of corresponding convexities of said pinching surfaces are connected via a convexity of said bottom surface and each pair of corresponding concavities of said pinching surfaces are connected via a concavity of said bottom surface.

In the present invention, pairs of corresponding convexities of said pinching surfaces have phase difference in the circumferential direction of the pinching surfaces, and the convexities of said bottom surface connecting the corresponding convexities are formed to extend diagonally relative to the rotary shaft of said disk driving roller.

The present invention further comprises a power transmission means for transmitting rotational force of said driving means to said disk driving roller, wherein at least one of the rotary shaft of said driving means and the rotary shaft of said power driving transmission means is provided with a manual rotation means which allows the rotary shaft, on which the manual rotation means is provided, to be manually operated.

In the present invention, a gear train for transmitting the rotational force of said driving means to said disk driving roller is disposed on said first disk conveying arm.

The present invention further comprises an arm synchronous means for synchronizing the pivotal movement of said first disk conveying arm and the pivotal movement of said second disk conveying arm with each other.

In the present invention, said disk loading/unloading slot is provided with a disk holding portion for holding said disk.

In the disk storage medium processing apparatus of the present invention having the aforementioned structure, a pair of first and second disk conveying arms are adapted to hold the periphery of the disk to convey the disk to the traverse unit when a part of the disk is inserted through the disk loading/unloading slot and are adapted to hold the periphery of the disk to eject a part of the disk out of the apparatus body through the disk loading/unloading slot from the state that the disk is set to the traverse unit. Therefore, the disk storage medium processing apparatus can convey the disk by the arms to the centering position where the disk is clamped to the traverse unit while protecting the recording surface of the disk from damage or foreign matters such as dust. In addition, the conveyance of the disk to the traverse unit is conducted directly by the arms which can hold the disk of which a part is inserted through the disk loading/unloading slot and the conveyance of the disk from the traverse unit to eject a part of the disk through the disk loading/unloading slot is conducted directly by the arms, thereby eliminating the need for another conveying means for conveying the disk, which is inserted into the apparatus body, to the traverse unit. This simplifies the structure for conveying the disk, thus allows reduction in size of the apparatus, and allows easy and flexible setting of the control for conveyance of the disk.

The first disk conveying arm is provided with the disk driving roller capable of holding the periphery of the disk and the second disk conveying arm is provided with the disk guide portion, made of friction material and which can hold the periphery of said disk, thereby eliminating the need for a roller on the second disk conveying arm. This simplifies the structure for holding the disk of the second disk conveying arm. In addition, the disk is conveyed while being rotated about a point which is a contact portion with the disk guide portion, made of friction material, of the second disk conveying arm, thereby enabling the stable conveyance of the disk.

Since the biasing force biasing the first disk conveying arm is set to be more than the biasing force biasing the second disk conveying arm, the disk is pressed against the disk guide portion of the second disk conveying arm while being conveyed by holding its periphery with the first and second disk conveying arms. Therefore, the disk can be conveyed with keeping the stable attitude.

The clamping portion capable of clamping the periphery of the disk is formed in the disk loading/unloading slot on the second disk conveying arm side, whereby the periphery of the disk is clamped by the clamping portion of the disk loading/unloading slot with the biasing force of the first disk conveying arm when the disk is inserted through the disk loading/unloading slot and when the disk is ejected through the disk loading/unloading slot. Therefore, the stable attitude of the disk can be kept when a part of the disk is inserted through the loading/unloading slot and when a part of the disk is ejected through the loading/unloading slot. Accordingly, the user can easily insert the disk into the loading/unloading slot and easily take out the disk from the loading/unloading slot.

The disk driving roller for conveying the disk is disposed on the first disk conveying arm and the gear train for transmitting rotational force to the disk driving roller is arranged on the first disk conveying arm, whereby the rotational force of the driving motor can be reliably transmitted to the disk driving roller even though the first disk conveying arm pivots. In addition, the efficient use of the first disk conveying arm eliminates the need for a space for mounting the gear train onto the apparatus body. This also allows reduction in size of the apparatus.

The pivotal movement of the first disk conveying arm and the pivotal movement of the second disk conveying arm are synchronized with each other by the arm synchronous means, whereby the conveying control of the disk can be securely and easily conducted such that the disk can be conveyed from the disk loading/unloading slot to the centering position of the traverse unit and can be conveyed from the centering position of the traverse unit to the disk loading/unloading slot without leaning the disk within the apparatus body.

The disk loading/unloading slot is provided with a disk holding portion for holding the disk, whereby the disk can be held stably in the state that a part of the disk is ejected from the apparatus body so as to allow the user to easily take out the disk from the apparatus body.

Trigger for starting the conveyance of the disk is set according to the diameter of the disk by the trigger setting means, thereby easily and flexibly responding the disk whether the disk has the small diameter or the large diameter and thus constantly and easily conducting the control for conveyance of the disk of either diameter.

The disk diameter discrimination means for discriminating the diameter of the disk is disposed on at least one of the first through third disk conveying arms, thereby eliminating the need for another disk discrimination means for conducting the control for conveyance according to the diameter of the disk. This can reduce the number of parts and eliminate the need for a space of mounting the another discrimination means on the apparatus body, thereby allowing reduction in size of the apparatus.

The disk conveying arm has a bendable structure composed of the first and second arm members and either one of the first and second arm members is adapted to hold the periphery of the disk at one location and then hold the periphery of the disk at two locations, thereby holding the disk stably and reliably conducting the centering of the disk. Therefore, the centering of the disk by the disk conveying arms can be further reliably conducted whether the diameter of the disk is small or large.

When one of the first and second arm members of the disk conveying arm is spaced apart from the periphery of the disk, the one of the first and second arm members pivots relative to the other one in the reverse direction so as to bend the conveying arm, thereby reducing its radius of gyration and thus further allowing reduction in size of the apparatus.

A plurality of controls such as the control for conveyance of the disk, the control for centering of the disk, control for clamping or unclamping the disk relative to the turn table, and the control for opening or closing the shutter are conducted by only one control member whether the diameter of the disk is small or large, thereby eliminating the need for respective control members for conducting these controls and thus reducing the number of parts. In addition, it facilitates these controls and thus improves the controllability. Moreover, it can eliminate the need for spaces for mounting the respective control members on the apparatus body, thereby allowing further reduction in size of the apparatus.

The centering of the disk is conducted by the disk conveying arms, thereby further reliably and easily conducting the centering of the disk whether the diameter of the disk is small or large. Since the disk conveying arm has a bendable structure composed of the first and second arm members, the disk can be reliably held by the single disk conveying arm whether the disk has the small diameter or the large diameter and, in addition, the radius of gyration of the disk conveying arm is reduced, thereby allowing further reduction in size of the apparatus. Moreover, the locations where the periphery of the disk is held are determined according to the diameter of the disk, whereby even the small-diameter disk can be securely held.

The disk driving roller of the first disk conveying arm and the disk driven roller of the second disk conveying arm both rotate, whereby the disk of which a part is inserted through the disk loading/unloading slot can be drawn into the apparatus body with little rotation of the disk and without significantly deflecting the center of the disk to one of the disk driving roller and the disk driven roller, thereby preventing the user from feeling uncomfortable.

The disk is conveyed to the clamper supporting means by holding the periphery of the disk with the disk driving roller and the disk driven roller and the disk is conveyed from the clamper supporting means by holding the periphery of the disk with the disk driving roller and the disk driven roller and rotating the disk driving roller and the disk driven roller to eject a part of the disk through the disk loading/unloading slot, whereby the disk can be conveyed by the arms to the centering position where the disk is clamped by the clamper supported by the clamper supporting means while protecting the recording surface of the disk from damage or foreign matters such as dust. This also enables smooth and stable insertion and ejection of the disk. In addition, the conveyance of the disk to the clamper supporting means is conducted directly by the arms which can hold the disk of which a part is inserted through the disk loading/unloading slot and the conveyance of the disk from the clamper supporting means to eject a part of the disk through the disk loading/unloading slot is conducted directly by the arms, thereby eliminating the need for another conveying means for conveying the disk, which is inserted into the apparatus body, to the clamper supporting means. This simplifies the structure for conveying the disk, thus allows reduction in size of the apparatus, and allows easy and flexible setting of the control for conveyance of the disk.

Since the biasing force biasing the first disk conveying arm is set to be more than the biasing force biasing the second disk conveying arm, the disk is pressed against the disk driven roller of the second disk conveying arm while being conveyed by holding its periphery with the first and second disk conveying arms. Therefore, the disk can be conveyed with keeping the stable attitude.

When the user inserts the disk through the disk loading/unloading slot so that the upper and lower edges of the periphery of the disk come in contact with the disk driving roller, the pinching surfaces of the disk driving roller sandwich the disk intermittently, thereby generating larger driving force between the disk driving roller and the disk. The large driving force ensures the pivotal movement of the first and second disk guide arms in the opening directions.

Since the disk pinching portion is composed of an elastic member such as a rubber member and the convexities of the bottom surface are formed to extend diagonally relative to the rotary shaft of said disk driving roller, the convexities on the both pinching surfaces of the disk pinching portion are elastically deformed when the periphery of the disk is sandwiched from above and below between the convexities on the both pinching surfaces so that the periphery of the disk can come in contact with the convexities on the bottom surface. Therefore, when the disk driving roller is rotated, the disk is pressed toward either one of the pinching surfaces by boundary edges between the convexities of the bottom surface and the concavities of the bottom surface according to the rotational direction of the disk driving roller, thereby increasing the driving force to be transmitted from the disk driving roller to the disk and thus further ensuring the conveyance of the disk.

By the manual rotation means provided on at least one of the rotary shaft of said driving means and the rotary shaft of said power driving transmission means, the rotary shaft, on which the manual rotation means is provided, is allowed to be manually operated. Therefore, in an emergency when the disk can not be ejected from the disk storage processing apparatus by the rotational force of the driving means from the state that the disk is housed in the disk storage medium processing apparatus because the driving means does not work from any cause or because the power transmission means does not transmit the rotational force of the driving means to the disk driving roller from any cause at the input side of the rotary shaft of the power transmission means on which the manual rotation means is provided, the disk can be ejected from the disk storage medium processing apparatus easily by manually rotating the rotary shaft on which the manual rotation means is provided.

When the user inserts the disk through the disk loading/unloading slot and the upper and lower edges of the periphery of the disk come in contact with the disk driving roller, the pinching surfaces of the disk driving roller hold the disk intermittently, thereby generating larger driving force between the disk driving roller and the disk. The large driving force ensures the pivotal movement of the first and second disk guide arms in the opening directions.

The disk driving roller for conveying the disk is disposed on the first disk conveying arm and the gear train for transmitting power for rotating the disk driving roller is also disposed on the first disk conveying arm, whereby the rotational force of the driving motor can be reliably transmitted to the disk driving roller even though the first disk conveying arm pivots. In addition, the efficient use of the first disk conveying arm eliminates the need for a space for mounting the gear train onto the apparatus body. This also allows reduction in size of the apparatus.

The pivotal movement of the first disk conveying arm and the pivotal movement of the second disk conveying arm are synchronized with each other by the arm synchronous means, whereby the conveying control of the disk can be securely and easily conducted such that the disk can be conveyed from the disk loading/unloading slot to the centering position of the traverse unit and can be conveyed from the centering position of the traverse unit to the disk loading/unloading slot without leaning the disk within the apparatus body.

The clamping portion capable of clamping the periphery of the disk is formed in the disk loading/unloading slot on the second disk conveying arm side, whereby the periphery of the disk can be clamped by the disk clamping portion of the disk loading/unloading slot with the biasing force of the first disk conveying arm when the disk is inserted into the disk loading/unloading slot or when the disk is ejected from the disk loading/unloading slot. Therefore, the attitude of the disk can be kept in the stable state when a part of the disk is inserted into the disk loading/unloading slot or when a part of the disk is ejected from the disk loading/unloading slot. Accordingly, the user is allowed to easily insert the disk into the disk loading/unloading slot and easily take out the disk from the loading/unloading slot.

Still other objects and advantages of the invention will in part be obvious and will in part be apparent from the specification.

The invention accordingly comprises the features of construction, combinations of elements, and arrangement of parts which will be exemplified in the construction hereinafter set forth, and the scope of the invention will be indicated in the claims.

BRIEF DESCRIPTION OF THE DRAWING

FIGS. 1(a)-1(c) schematically show an embodiment of a disk storage medium processing (recording/reproduction) apparatus according to the present invention, wherein FIG. 1(a) is a perspective view thereof, FIG. 1(b) is an illustration of a disk loading/unloading slot thereof, and FIG. 1(c) is an illustration of a variation of the disk loading/unloading slot;

FIGS. 2(a) and 2(b) show a portion about the disk loading/unloading slot of the disk storage medium processing apparatus of this embodiment, wherein FIG. 2(a) is a perspective view showing a state where the disk loading/unloading slot is opened and FIG. 2(b) is a perspective view showing a state where the disk loading/unloading is closed.

FIGS. 4(a)-4(c) show a first disk guide arm, wherein FIG. 4(a) is a perspective view thereof taken obliquely from above, FIG. 4(b) is a perspective view thereof taken from the direction IVB in FIG. 4(a), and FIG. 4(c) is a perspective view thereof taken from the direction IVC in FIG. 4(a);

FIGS. 5(a) and 5(b) show a second disk guide arm, wherein FIG. 5(a) is a perspective view thereof taken obliquely from above and FIG. 5(b) is a perspective view thereof taken from the direction VB in FIG. 5(a);

FIGS. 7(a) and 7(b) show a disk holding arm, wherein FIG. 7(a) is a perspective view thereof and FIG. 7(b) is an illustration for explaining the action thereof;

FIGS. 12(a)-12(c) show a slide cam member, wherein FIG. 12(a) is a perspective view thereof taken from a disk loading/unloading slot side, FIG. 12(b) is a perspective view thereof taken from the direction XIIB in FIG. 12(a), and FIG. 12(c) is a perspective view thereof taken from the direction XIIC in FIG. 12(b);

FIGS. 17(a) and 17(b) show a traverse unit, wherein FIG. 17(a) is an illustration showing a state where the traverse unit is at its lower position and FIG. 17(b) is an illustration showing a state where the traverse unit is at its upper position;

DESCRIPTION OF THE PREFERRED EMBODIMENTS

Hereinafter, best modes for carrying out the present invention will now be described with reference to the drawings.

Figure 1A:
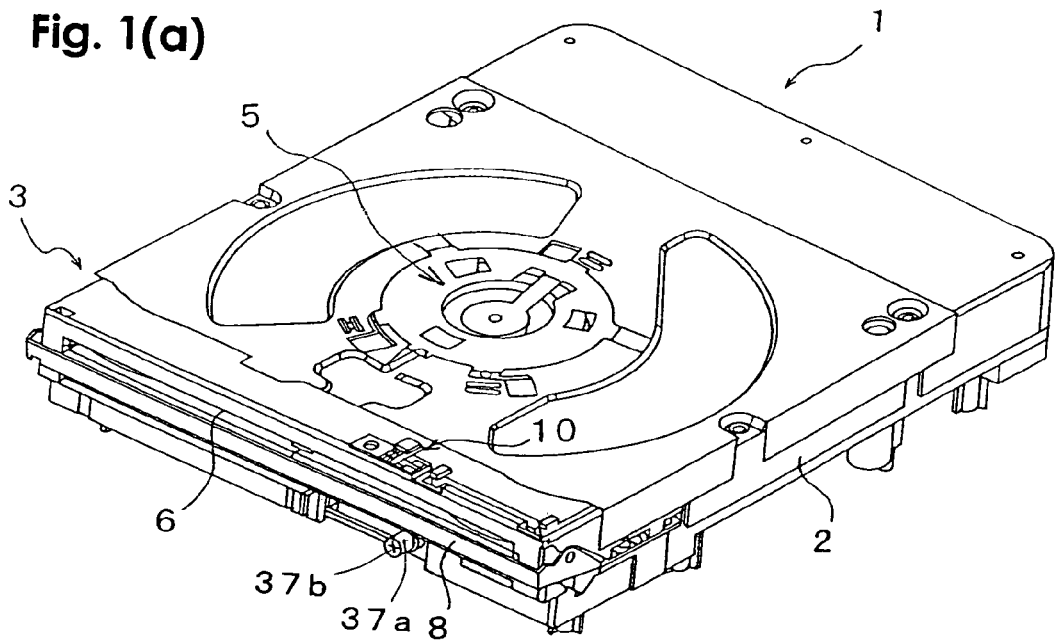
Figure 1B:
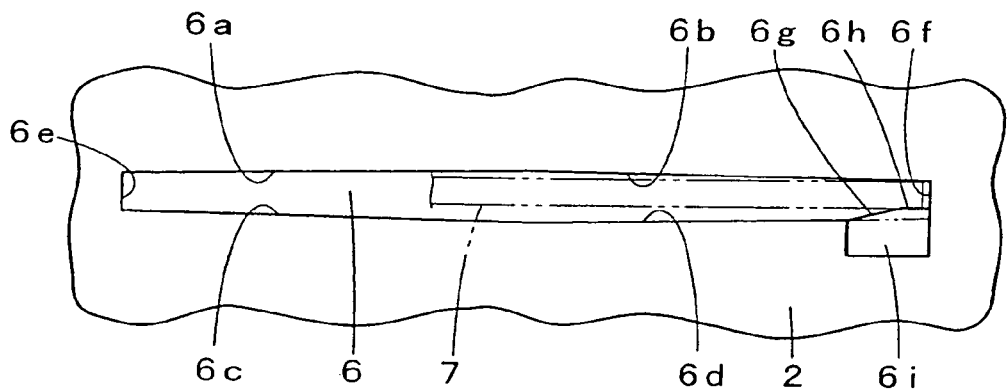
Figure 1C:
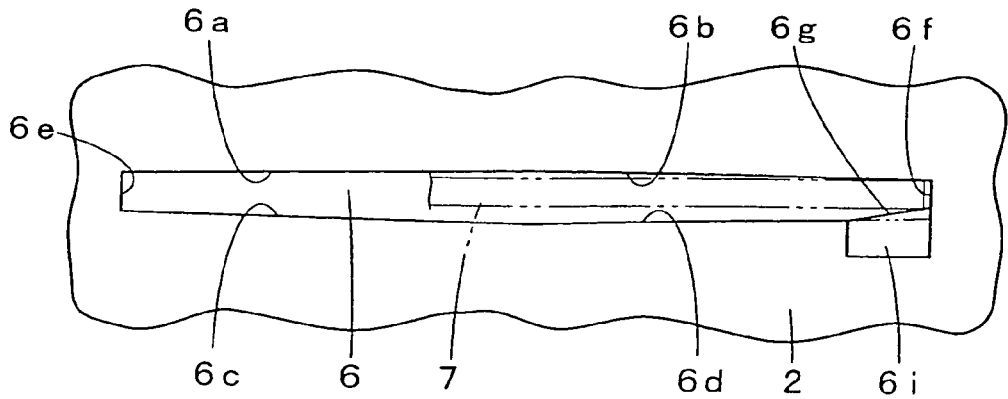

FIGS. 1(a)-1(c) schematically show an embodiment of a disk storage medium processing (recording/reproduction) apparatus according to the present invention, wherein FIG. 1(a) is a perspective view thereof, FIG. 1(b) is an illustration of a disk loading/unloading slot thereof, and FIG. 1(c) is an illustration of a variation of the disk loading/unloading slot. FIGS. 2(a) and 2(b) show a portion about the disk loading/unloading slot of the disk storage medium processing apparatus of this embodiment, wherein FIG. 2(a) is a perspective view showing a state where the disk loading/unloading slot is opened and FIG. 2(b) is a perspective view showing a state where the disk loading/unloading is closed.

As shown in FIG. 1(a), the disk storage medium processing apparatus 1 of this embodiment generally comprises a disk loading/unloading section 3 which is formed at an end of a rectangular apparatus body 2 and a clamper supporting section 5 which is disposed adjacent to the disk loading/unloading section 3 within the apparatus body 2 to support a clamper which can clamp a disk relative to a traverse unit 4. The traverse unit 4 conducts at least one of recording, deletion, and reproduction of information onto or from the disk. As shown in FIG. 1(b) and an enlarged view of FIG. 2(a), a disk loading/unloading slot 6 is formed in an end face of the apparatus body 2 at the disk loading/unloading section 3 of the disk storage medium processing apparatus 1. The disk 7 is inserted into the apparatus body 2 through the disk loading/unloading slot 6, while the disk 7 inside the apparatus body 2 is unloaded from the apparatus body 2 through the disk loading/unloading slot 6.

As shown in FIG. 1(b), the disk loading/unloading slot 6 is formed in substantially a rhombic shape, as seen along the disk inserting direction, consisting of four slant faces 6a, 6b, 6c, and 6d which are extremely gentle slopes. In this regard, there are vertical sides 6e, 6f at the both lateral ends in the rhombic shape as shown in FIG. 1(b) so that the slant faces 6a and 6c; 6b and 6d do not directly intersect with each other. Because of these slant faces 6a, 6b, 6c, and 6d, the recording surface of the disk 7 is prevented from coming in contact with the slant faces 6a, 6b, 6c, and 6d.

At the right end of the lower-side slant face 6d of the disk loading/unloading slot 6, there is provided a disk holding member 6i. The disk holding member 6i comprises a slant face 6g, of which inclination angle is larger than that of the slant face 6d, and a horizontal face 6h, as can be seen in FIG. 1(b), continued from the slant face 6g. The disk holding member 6i is made of an elastic material. The upper-side slant face 6b and the lower-side horizontal face 6h compose together a disk holding portion 6j because the upper-side slant face 6b and the lower-side horizontal face 6h cooperate to sandwich the periphery of the disk 7 therebetween. In this regard, when the periphery of the disk 7 is held by the disk holding portion 6j, the disk holding member 6i is slightly elastically deformed, thereby securely holding the disk 7 resiliently. In addition, the face along the periphery of the disk 7 is in contact with the horizontal face 6h, whereby the disk 7 is stably held by the disk holding portion 6j. Since the face of the disk 7 where is in contact with the horizontal face 6h is in non-recordable portion 7b (shown in FIG. 18), the recording of information to the disk 7 and the reproduction of information stored in the disk 7 are never affected even though the face of the disk 7 is in contact with the horizontal face 6h.

The disk holding member 6i may be disposed on the right end of the upper-side slant face 6b or may be disposed on each of the right ends of the upper- and lower-side slant faces 6b and 6d. In this case, the disk holding member 6i disposed on the upper-side slant face 6b is vertically symmetrical to the disk holding member 6i disposed on the lower-side slant face 6d. As shown in FIG. 1(c), the disk holding member 6i may not have the horizontal face 6h so that the disk holding member 6i has only the slant face 6g. In this case, the periphery of the disk 7 is sandwiched between the two slant faces 6b and 6g. Moreover, the disk holding member 6i may not have the slant face 6g so that the disk holding member 6i has only the horizontal face 6h. In this case, the inclination angle of the slant face is desired to be somewhat increased in order to securely introduce the periphery of the disk 7 between the upper-side slant face 6b and the horizontal face 6h. However, in order to securely introduce the periphery of the disk 7 to be stably held between the upper-side slant face 6b and the horizontal face 6h, the disk holding member 6i is desired to have both the slant face 6b and the horizontal face 6h.

The apparatus body 2 is provided with a shutter 8 for covering and uncovering the disk loading/unloading slot 6. The shutter 8 is pivotably attached to both end faces of the apparatus body 2. The shutter 8 is always biased by a gate control spring 9 (see FIG. 16) in a direction opening the disk loading/unloading slot 6 (in the counter-clockwise direction in FIG. 2(a)). When the disk storage medium processing apparatus is not used (that is, when no disk is loaded), the shutter 8 is kept in a state where the disk loading/unloading slot 6 is uncovered as shown in FIG. 2(a). The control of closing of the shutter 8 to cover the disk loading/unloading slot 6 will be described later.

As shown in FIG. 2(a), a disk sensor 10 for detecting the disk 7 inserted through the disk loading/unloading slot is disposed on an inner side of the apparatus body 2 relative to the disk loading/unloading slot 6. As the disk sensor 10, for example, a known optical sensor may be used which comprises an emitter for emitting light and a receiver for receiving the light from the emitter, wherein when the disk 7 is inserted, the receiver is covered by the disk 7 from the light of the emitter and thus can not detect the light, whereby the optical sensor detects the disk 7. As the disk sensor 10, however, any sensor not affecting the operation of loading/unloading the disk 7 other than the optical sensor may be used. This embodiment will be described in a case using an optical sensor as the disk sensor 10. Since the optical sensor 10 may be a conventional one as mentioned above, the description of the specific structure of the optical sensor 10 will be omitted.

Figure 3:
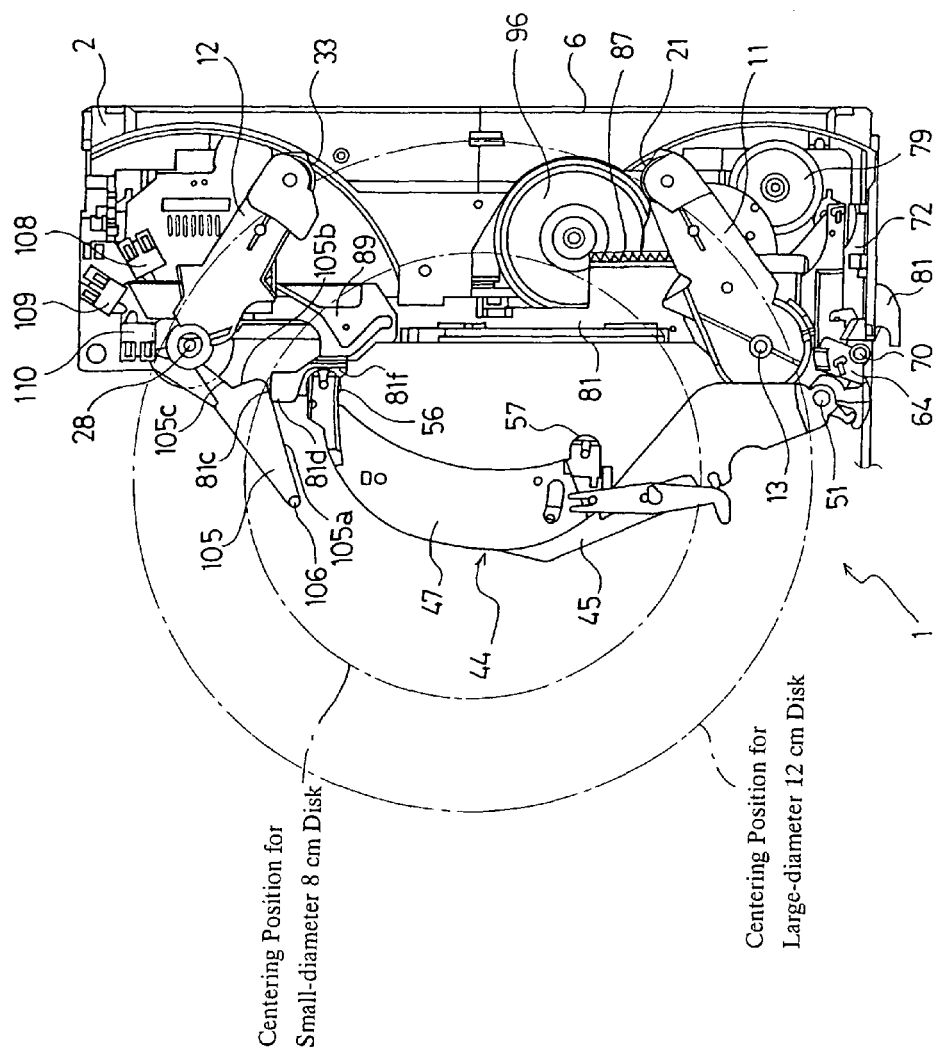
FIG. 3 is a plan view (top view) partially showing the disk storage medium processing apparatus in the non-operational state without an upper cover of an apparatus body.

FIG. 3 is a plan view (top view) partially showing the disk storage medium processing apparatus in the non-operational state without an upper cover of the apparatus body.

As shown in FIG. 3, a pair of first and second disk guide arms 11, 12 are pivotably attached to the apparatus body 2 at the disk loading/unloading section 3. The first and second disk guide arms 11, 12 compose disk conveying arms as disk conveying means. As shown in FIG. 4(a), the first disk guide arm 11 is provided at one end thereof with a supporting hole 14 through which a rotary shaft 13 projecting from the apparatus body 2 is inserted. The rotary shaft 13 is fitted into the supporting hole 14, wherein the first disk guide arm 11 is pivotably supported on the apparatus body 2.

As shown in FIG. 4(b), a portion of the first disk guide arm 11 where the supporting hole 14 is formed is circular. In the outer periphery of the circular portion 15, a cam 16 is formed. The cam 16 has a cam surface 16a raising in the counter-clockwise direction when seen in FIG. 4(b). As will be described later, the cam 16 composes a disk diameter discrimination means.

On the circular portion 15 of the disk guide arm 11, there is formed a cylindrical rotary shaft 17 coaxially with the supporting hole 14 as shown in FIG. 4(c). The rotary shaft 17 is provided at one end thereof with a gear 18 formed integrally with and all around the rotary shaft 17. As shown in FIG. 4(c), the first disk guide arm 11 has two projecting pins 19, 20 as shown in FIG. 4(c).

On one side of the first disk guide arm 11, there is mounted a disk driving roller 21 as shown in FIG. 4(a). The disk driving roller 21 is disposed at the other end side opposite from the supporting hole 14 (that is, the tip end side of the first disk guide arm 11) and is rotatably supported. The disk driving roller 21 comprises a disk guide portion 21a which is made of a resin to be formed in an inverted truncated cone having a guide surface for guiding the upper peripheral edge, when seen in FIG. 4(a), of the disk 7 and a disk pinching portion 21b which is fixed to the disk guide portion 21a to rotate together with the disk guide portion 21a and is an elastic member such as a rubber member having pinching surfaces 21c, 21d composed of a pair of circular conical surfaces and a pinching groove for sandwiching the periphery of the disk 7 from above and below. The pair of pinching surfaces 21c, 21d which cooperate together to form a pinching groove are both curved surfaces continued circumferentially. The disk driving roller 21 rotates while the periphery of the disk 7 is sandwiched from above and below by the pair of pinching surfaces 21c, 21d at the pinching groove of the disk pinching portion, thereby performing the loading and the unloading of the disk 7.

On the other side of the first disk guide arm 11 which is opposite to the one side with the disk driving roller 21, there is mounted a gear train 22 as shown in FIG. 4(c). The gear train 22 comprises a first gear 23, a second gear 24, a third gear 25, a fourth gear 26, and a fifth gear 27. The second gear 24 has a diameter smaller than that of the first gear 23 and is formed integrally with and coaxially with the first gear 23. The first and second gears 23, 24 are adapted to rotate together about the rotary shaft 17 of the first disk guide arm 11. In this regard, the supporting hole 14 and the cylindrical rotary shaft 17 are rotatably fitted with the rotary shaft 13 of the apparatus body 2.

The third gear 25 is supported on the first disk guide arm 11 such that the third gear 25 meshes with the second gear 24 and thus rotates. The fourth gear 26 is supported on the first disk guide arm 11 such that the fourth gear 26 meshes with the third gear 25 and thus rotates. The fifth gear 27 is supported on the first disk guide arm 11 such that the fifth gear 27 meshes with the fourth gear 26 and thus rotates. The fifth gear 27 is coaxial with the disk driving roller 21 and can rotate together with the disk driving roller 21. The first and second gears 23 and 24, the third gear 25, the fourth gear 26, and the fifth gear 27 are aligned in this order in a straight line or substantially a straight line along the longitudinal direction from the supporting hole 14 side to the disk driving roller 21 side. The first disk guide arm 11 is always biased by a spring (not shown) in the counter-clockwise direction in FIG. 3, that is, in a such a direction that the disk driving roller 21 comes closer to a disk guide portion 33 (as will be described later) of the second disk guide arm 12. The first through fifth gears 23, 24, 25, 26, and 27 are not limited to be aligned in a straight line or substantially a straight line and may be shifted somewhat from the straight line. The first through fifth gears 23, 24, 25, 26, and 27 only have to be arranged along the longitudinal direction within the range of the first disk guide arm 11.

Figure 5A:
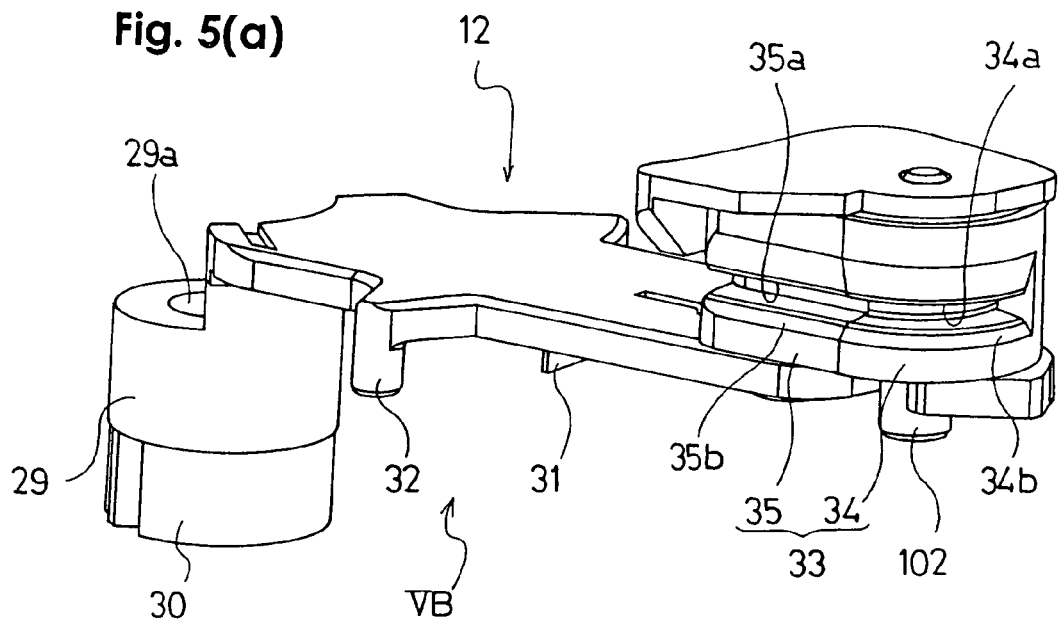

As shown in FIG. 5(a), the second disk guide arm 12 is provided at one end side thereof with a boss 29 having a supporting hole 29a through which a rotary shaft 28 (as shown in FIG. 3) projecting from the apparatus body 2 is inserted. The rotary shaft 28 is fitted into the boss 29, wherein the second disk guide arm 12 is pivotably supported on the apparatus body 2. The boss 29 is also provided with a cylindrical gear 30 to be formed coaxially with and integrally with the boss 29.

Figure 5B:
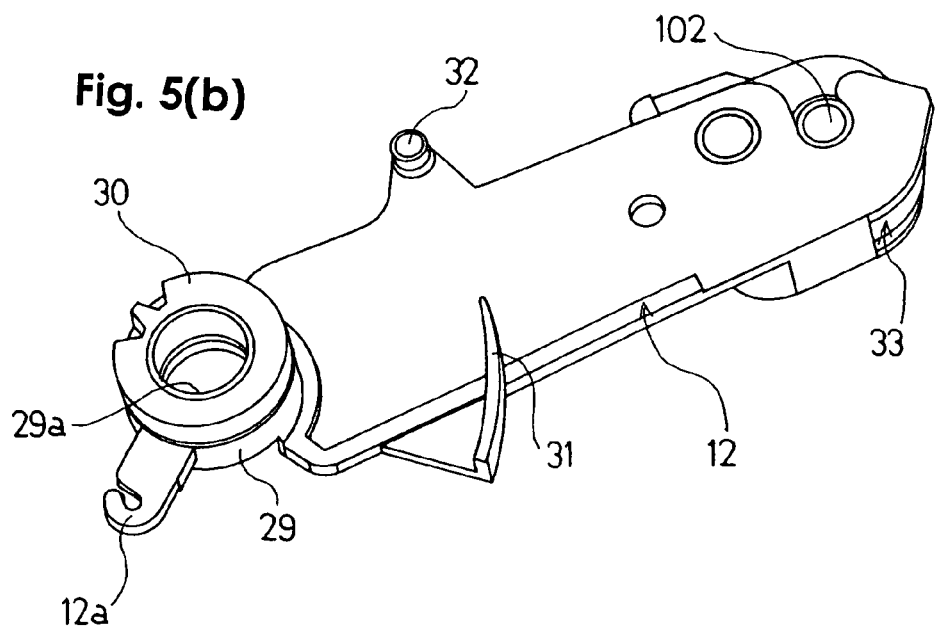

On the bottom, when seen in FIG. 5(a), of the second disk guide arm 12, there is formed a switch actuator 31 as shown in FIG. 5(b). The switch actuator 31 is formed into a circular arc shape coaxial with the supporting hole 29a. On the bottom of the second disk guide arm 12, there is also formed a projecting pin 32.

As shown in FIG. 5(a), on the other end side of the second disk guide arm 12, there is provided a disk guide portion 33 which can not rotate relative to the second disk guide arm 12. The disk guide portion 33 comprises a first guide holding portion 34 which is formed in a circular arc shape at the end side of the disk guide portion 33, and a linear second guide holding portion 35 which is formed to extend tangentially from the first guide holding portion 34 toward the boss 29 side in parallel with the disk loading direction or the disk unloading direction. The first guide holding portion 34 comprises a disk guide portion 34a which is made of a resin to be formed in a partial inverted truncated cone having a guide surface for guiding the upper peripheral edge, when seen in FIG. 5(a), of the disk 7 and a disk pinching portion 34b which is integrally fixed to the disk guide portion 34a and is an elastic member such as a rubber member having a circular arc pinching groove for sandwiching the periphery of the disk 7 from above and below and for guiding the disk 7. The linear guide holding portion 35 comprises a disk guide portion 35a which is made of a resin to be formed in a slant face having a guide surface for guiding the upper peripheral edge, when seen in FIG. 5(a), of the disk 7 and a disk pinching portion 35b which is integrally fixed to the disk guide portion 35a and is an elastic member such as a rubber member having a linear pinching groove for sandwiching the periphery of the disk 7 from above and below and for guiding the disk 7. It should be noted that the first guide holding portion 34 is not limited to be formed in a circular arc shape and may be formed into a linear shape inclined relative to the second guide holding portion 35 in such a manner as to spread in the disk unloading direction.

The upper and lower peripheral edges of the disk 7 are supported by the circular pinching groove of the first guide holding portion 34 and the linear pinching groove of the linear guide holding portion 35 so that the disk 7 is guided along these grooves.

Biasing force of a spring 36 (shown in FIG. 18 as will be described later) is applied to a spring supporting portion 12a (as shown in FIG. 5(b)) of the second disk guide arm 12, whereby the second disk guide arm 12 is always biased in the clockwise direction when seen in FIG. 3, i.e., in a such direction that the disk guide portion 33 comes closer to the disk driving roller 21 of the first disk guide arm 11. In this regard, the biasing force on the first disk guide arm 11 is set to be more than the biasing force on the second disk guide arm 12 (it is desired that the biasing force on the first disk guide arm 11 is about three times as large as the biasing force on the second disk guide arm 12).

Figure 6:
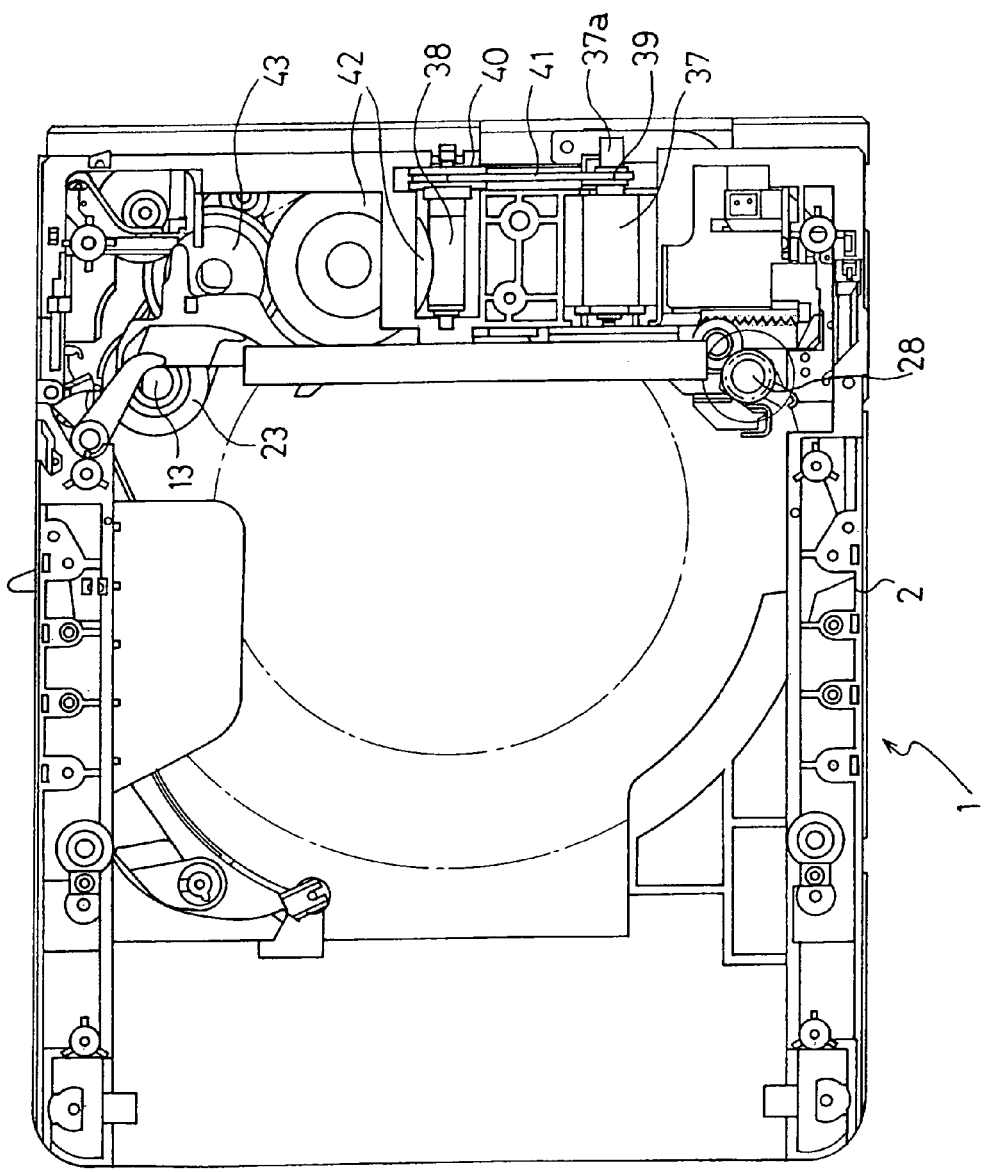
FIG. 6 is a plan view (top view) showing a driving part such as a driving motor of the disk storage medium processing apparatus of this embodiment.

FIG. 6 is a bottom view showing the disk storage medium processing apparatus without a lower cover of the apparatus body 2.

In the disk loading/unloading section 3 of the apparatus body 2, there are mounted a driving motor 37 and a worm 38 as shown in FIG. 6. The worm 38 is disposed parallel with a rotary shaft 37a of the driving motor 37 at a predetermined distance from the rotary shaft 37a. A driving pulley 39 is attached to the rotary shaft 37a of the driving motor 37, while a driven pulley 40 is attached to the worm 38. An endless belt 41 is wound around the driving pulley 39 and the driven pulley 40 so as to extend therebetween with some tension. By the endless belt 41, rotation is reduced and transmitted from the driving pulley 39 to the driven pulley 40.

Meshed with the worm 38 is a worm wheel 42 which is rotatably supported on the apparatus body 2 so that rotation of the worm 38 is reduced and converted into rotation of the worm wheel 42 about a rotary axis perpendicular to the worm 38. The rotation of the worm wheel 42 is transmitted to the first gear 23 of the gear train 22 on the first disk guide arm 11 via an intermediate gear 43 rotatably supported on the apparatus body 2. Therefore, rotational force of the driving motor 37 is reduced and transmitted to the disk driving roller 21 via the endless belt 41, the worm 38, the worm wheel 42, the intermediate gear 43, the first gear 23, the second gear 24, the third gear 25, the fourth gear 26, and the fifth gear 27.

As shown in FIG. 3, a disk holding arm 44 composing a disk conveying arm as a disk conveying means is pivotably supported on the apparatus body 2. As shown in FIG. 7(a), the disk holding arm 44 generally comprises a holding arm body 45 as an arm member and a holding assist arm 47 as an arm member which is connected to the holding arm body 45 by a pin 46 in such a manner as to allow pivotal movement relative to each other. In this case, the relative pivotal movement between the holding arm body 45 and the holding assist arm 47 is limited to a predetermined amount by a pin 48 projecting from the holding arm body 45 and a restriction slot 49 which is formed in the holding assist arm 47 to have a shape of an arc of a circle about the pin 46 and into which the pin 48 is fitted.

The holding arm body 45 is provided with a cylindrical column 50 having a supporting hole 50a integrally formed on an end thereof opposite to the side connected to the holding assist arm 47. As shown in FIG. 3, a supporting shaft 51 (shown in FIG. 3) projecting from the apparatus body 2 is fitted into a supporting hole 50a of the cylindrical column 50, whereby the holding arm body 45 is pivotably supported on the apparatus body 2. The column 50 is provided with a first pressing portion 52 and a second pressing portion 53 such that the first pressing portion 52 and the second pressing portion 53 can rotate together with the column 50. In this regard, the first pressing portion 52 is positioned lower than the second pressing portion 53 and precedes the second pressing portion 53 when rotates on the column 50 in the counterclockwise direction. The column 50 is also provided with a control arm 54 with is formed integrally with the column 50 to extend in a direction opposite to the holding arm body 45. The control aim 54 has two pins 55a, 55b at an end thereof.

On the both ends of the holding assist arm 47, there are mounted disk holding rollers 56 and 57, respectively. The disk holding rollers 56, 57 are adapted to hold the periphery of the disk 7. The disk holding hollers 56, 57 are rotatably supported by roller supporting members 58, 59 which are integrally fixed to the both ends of the holding assist arm 47, respectively. The disk holding rollers 56, 57 are arranged along a circular arc such that the disk holding rollers 56, 57 can hold the periphery of the disk 7 which is a small-diameter disk of 8 cm in diameter (hereinafter, sometimes referred to simply as a 8 cm disk) when the center of the 8 cm disk 7 is set at a position shown in FIG. 3 corresponding to the center of a turn table of a traverse unit 4 (hereinafter, this position will be sometimes referred to a centering position).

Further, the roller supporting member 59 has a pin 60 projecting therefrom. On the other hand, the holding arm body 45 is provided with a rotary shaft 62 projecting therefrom, whereby a switching lever 61 is supported to the holding arm body 45 by the rotary shaft 62 such that the switching lever 61 is rotatable relative to the holding arm body 45.

The switching lever 61 is provided with a slot 63 which is formed at an end near the holding assist arm 47. The pin 60 of the roller supporting member 59 is fitted into the slot 63. The other end, opposite to the end where the slot 63 is formed, of the switching lever 61 is formed into an L-like bent shape of which a tip portion functions as a pressed portion 61a.

Normally (that is, when no disk is inserted or the disk storage medium processing apparatus 1 is not in operation), the switching lever 61 is biased in the clockwise direction by a spring (not shown) as shown by solid lines in FIG. 7(b). Therefore, the pin 48 of the holding arm body 45 is in contact with an end of the restriction slot 49 so that the holding arm body 45 and the holding assist arm 47 are held in a state having a slant angle therebetween. When the holding assist arm 47 pivots a predetermined amount from the normal state in the counterclockwise direction relative to the holding arm body 45 against the biasing force of the spring so that the pin 48 of the holding arm body 45 comes in contact with the other end of the restriction slot 49 of the holding assist arm 47, the switching lever 61 is set such that the holding arm body 45 and the holding assist arm 47 are aligned substantially in a single circular arc shape as shown by chain double-dashed lines in FIG. 7(b).

The disk holding arm 44 is always biased in the clockwise direction when seen in FIG. 3 by a spring (not shown). When disk storage medium processing apparatus 1 is not in operation, the holding assist arm 47 is in contact with a stopper 81f of a slide cam member 81 (as will be described later) which is a control member and is located at its nonoperational position as shown in FIG. 3, whereby the disk holding arm 44 is held in its nonoperational position as shown in FIG. 3 such that the holding assist arm 47 is substantially located at a position corresponding to the center of the turn table of the traverse unit 4. When the disk holding arm 44 is in the nonoperational position, the disk holding roller 56 at the end of the holding assist arm 47 is located near the disk loading/unloading slot 6 (on the right hand side in FIG. 3) relative to the disk holding roller 57 at the other end of the holding assist arm 47.

Figure 8:
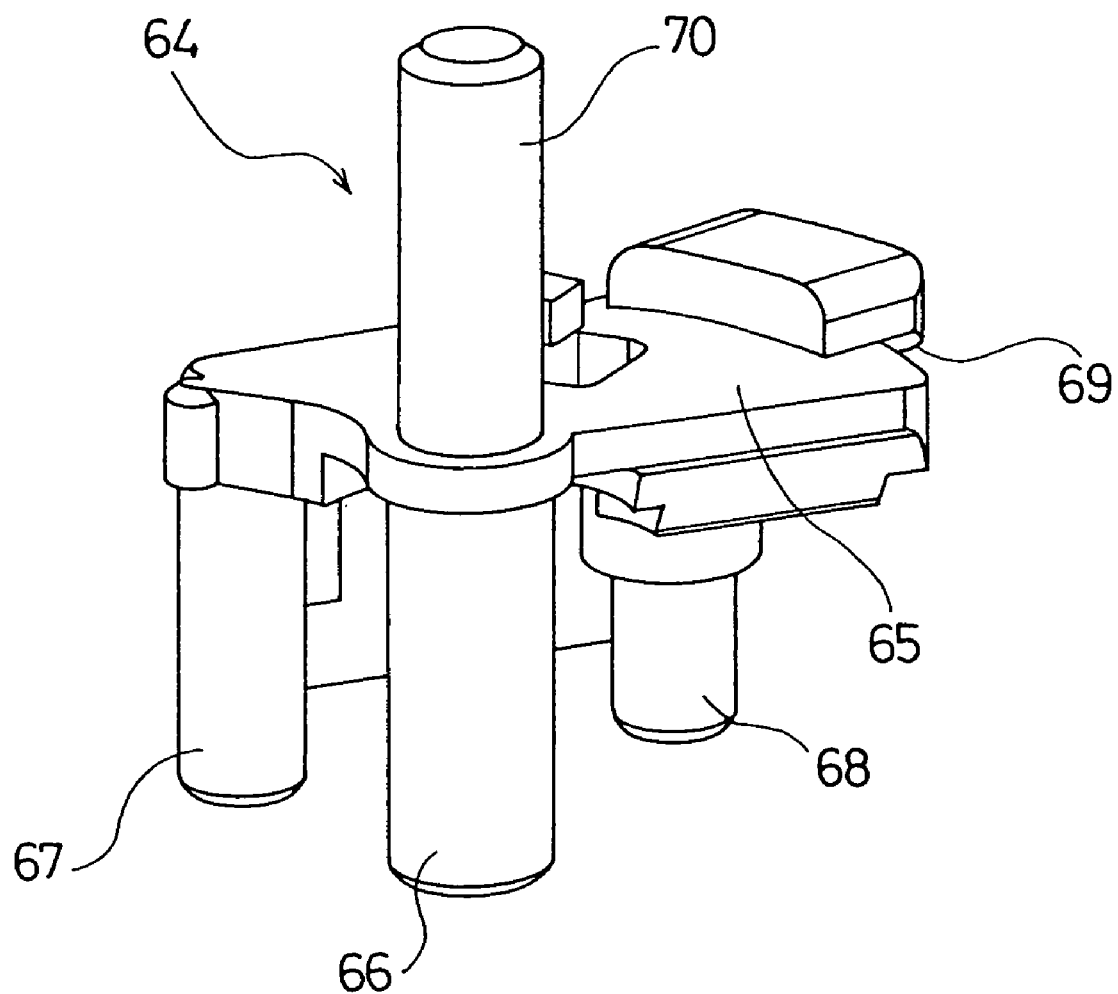
FIG. 8 is a perspective view showing a trigger lever.

As shown in FIG. 3, the apparatus body 2 is provided with a trigger lever 64 as a trigger setting means which is rotatably disposed adjacent to the supporting shaft 51 for the disk holding arm 44. As shown in FIG. 8, the trigger lever 64 comprises a plate-like rhomboidal body 65, a rotary shaft 66 which is formed at one corner of the body 65 to project downwards, a pressed column 67 which is formed at another corner of the body 65 to project downwards just like the rotary shaft 66 and which can come in contact with the first and second pressing portions 52, 53 of the disk holding arm 44, a pressing column 68 which is formed at further another corner of the body 65 to project downwards just like the rotary shaft 66, a cam contact portion 69 which is formed on the body 65 and which can come in contact with the cam surface 16a of the cam 16 of the first disk guide arm 11, and a spring supporting column 70 which is formed on the body 65 to project upwards.

Figure 9:
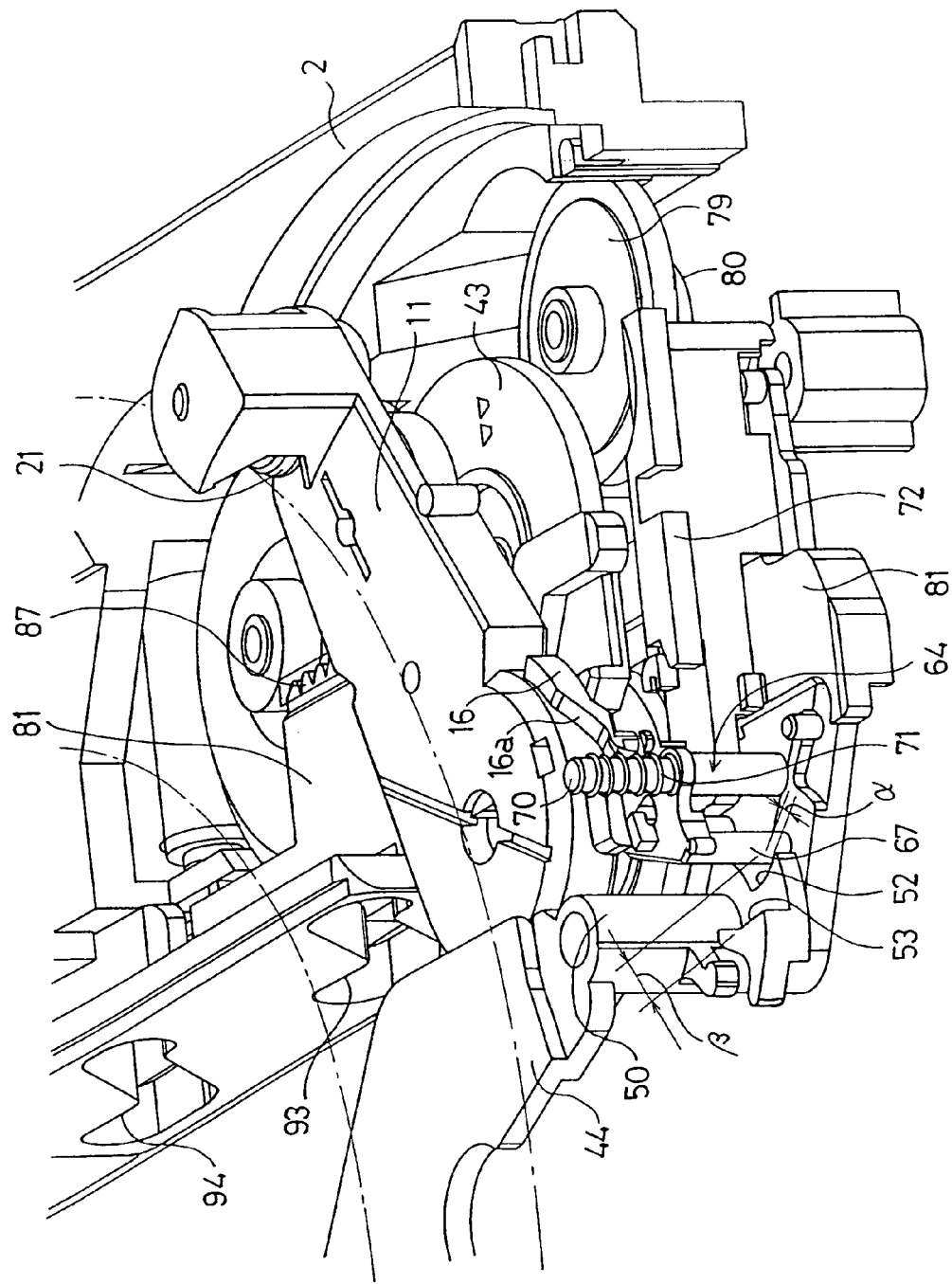
FIG. 9 is a perspective view partially showing a portion where the trigger lever is placed.

The rotary shaft 66 of the trigger lever 64 is fitted into a cylindrical supporting shaft (not shown) projecting from the apparatus body 2, whereby the trigger lever 64 is rotatably supported on the apparatus body 2. As shown in FIG. 9, a coil spring 71 is supported on and disposed around the spring supporting column 70 and is compressed between the body 65 and the upper cover of the apparatus body 2 so that the coil spring 71 always biases the trigger lever 64 downwards when seen in FIG. 9.

As shown in FIG. 9, the apparatus body 2 is also provided with a resetting slider 72 disposed adjacent to the trigger lever 64. The resetting slider 72 can be guided by a ridge-shaped guide rail (not shown) which is formed on a side plate of the apparatus body 2 so as to move straight in the longitudinal direction of the apparatus body 2, i.e., the left-right direction when seen in FIG. 3.

Figure 10:
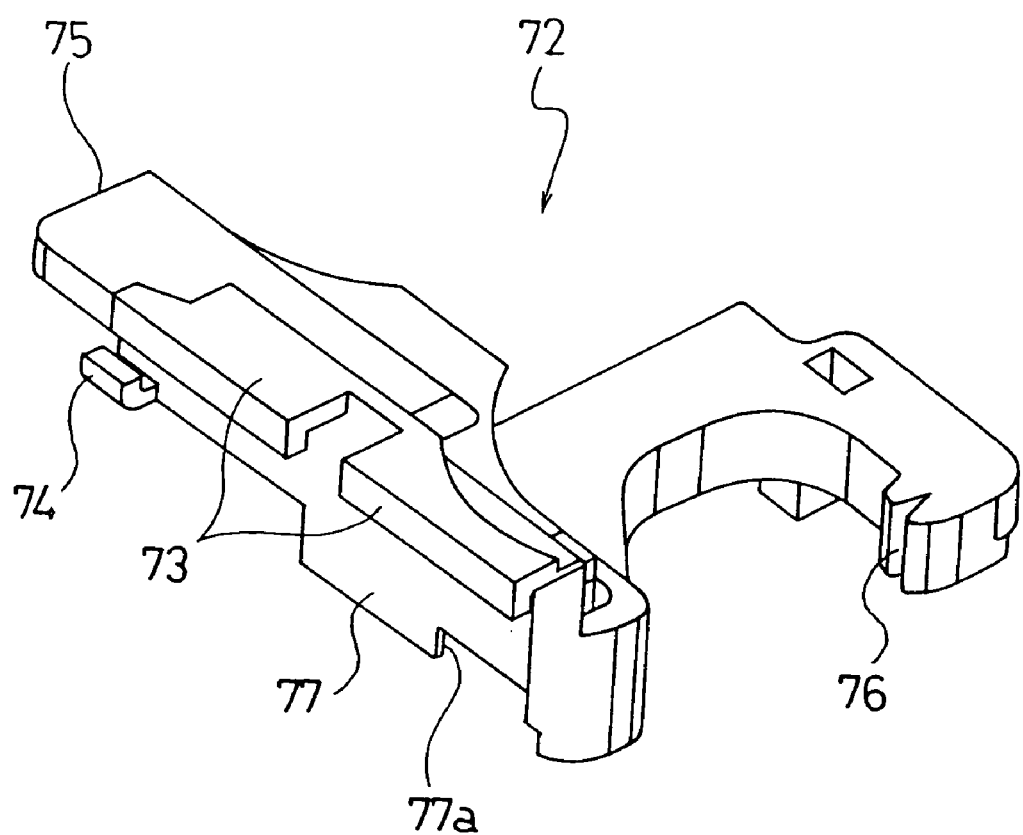
FIG. 10 is a perspective view showing a resetting slider.
Figure 11:
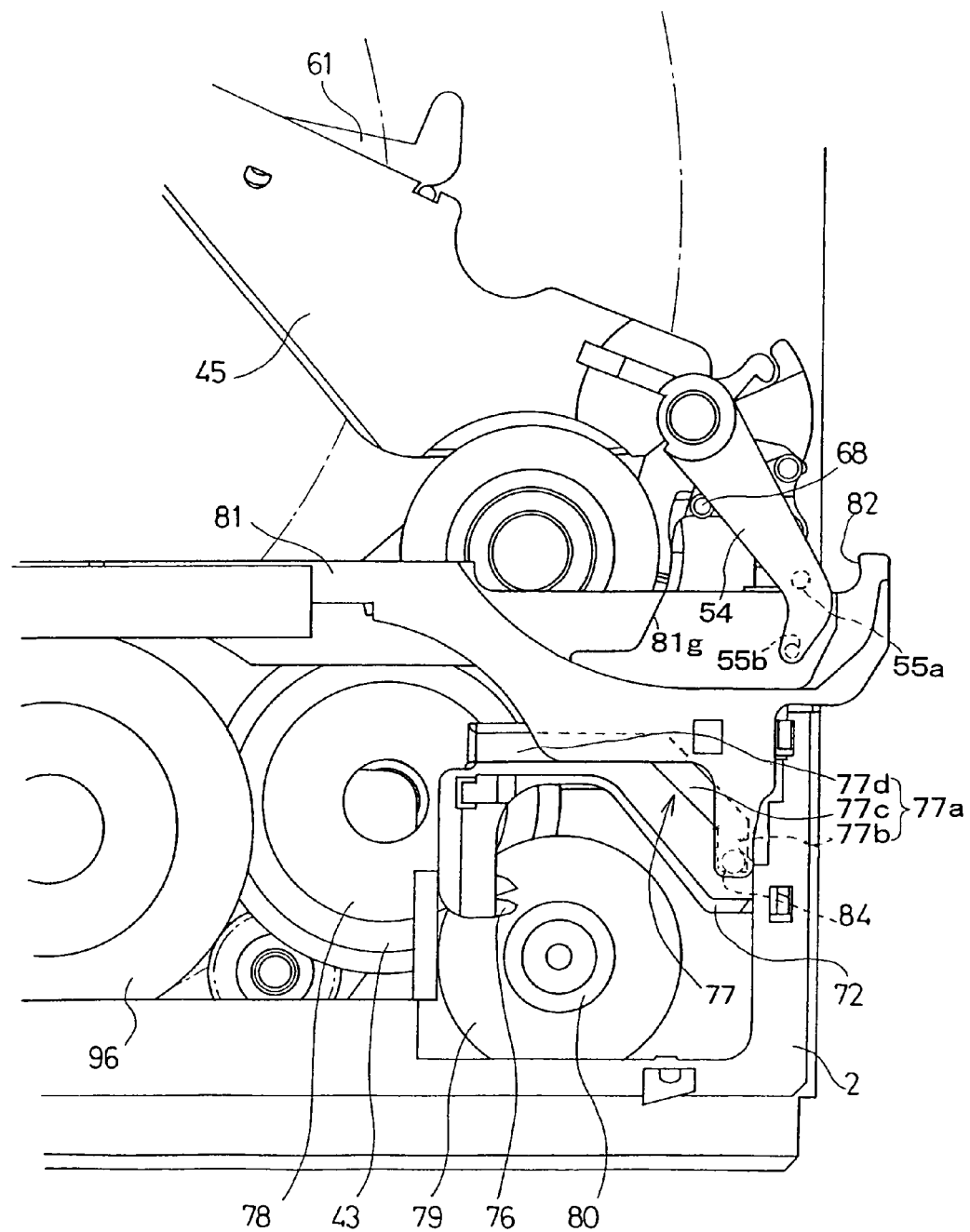
FIG. 11 is a bottom view partially showing a portion where the resetting slider is placed.

As shown in FIG. 10, the resetting slider 72 is formed in an h-like shape having two branches at its one end and comprises a pair of guide portions 73, 74 to be fitted on the ridge-shaped guide rail disposed on the side plate of the apparatus body 2, a pressed portion 75 which is formed on the other end and with which the pressing column 68 of the trigger lever 64 can come in contact, and a rack gear 76 which is formed on the end of one of the branches. In the lower surface, when seen in FIG. 10, of the resetting slider 72, a cam 77 having a cam groove 77*a* is formed as shown in FIG. 11. The cam groove 77*a* comprises a first cam groove portion 77*b* which extends linearly upwards when seen in FIG. 11, a second cam groove portion 77*c* which extends along a linear inclination from the upper end of the first cam groove portion 77*b* to an upper left, and a third cam groove portion 77*d* which extends linearly leftward from the upper end of the second cam groove portion 77*c*.

On the other hand, a small-diameter intermediate gear 78 of which diameter is smaller than that of the intermediate gear 43 is disposed coaxially with the intermediate gear 43 to rotate together with the intermediate gear 43. The small-diameter intermediate gear 78 always meshes with an intermediate gear 79 which is rotatably disposed on the apparatus body 2. Further, a slider driving gear 80 of which diameter is smaller than that of the intermediate gear 79 is disposed coaxially with and integrally with the intermediate gear 79 to rotate together with the intermediate gear 79. The rack gear 76 of the resetting slider 72 can mesh with the slider driving gear 80.

Figure 12A:
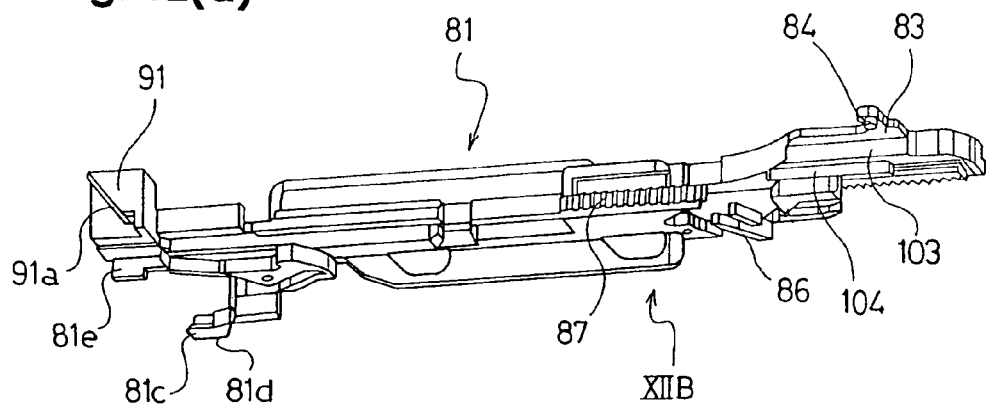
Figure 12B:
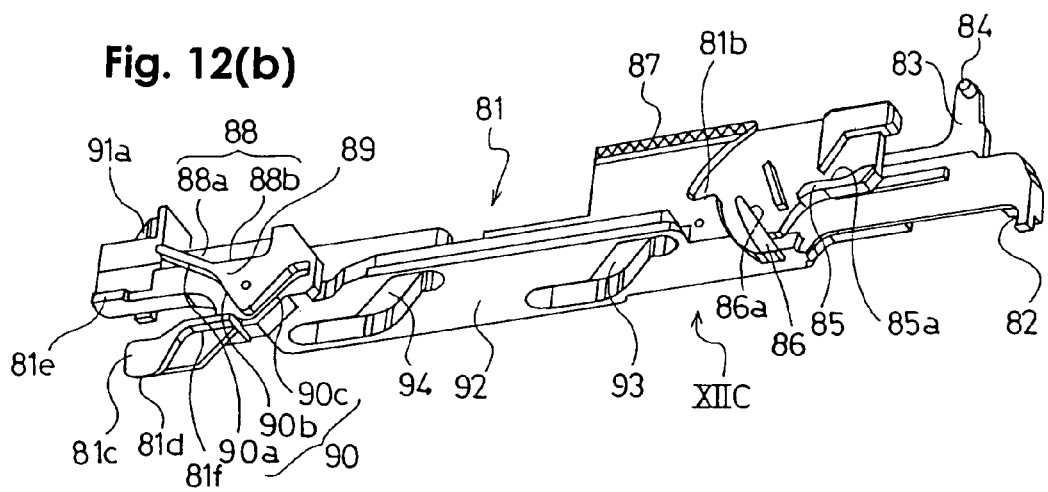

As shown in FIG. 3, the apparatus body 2 is provided with a slide cam member 81 such that the slide cam member 81 can move straight in a direction perpendicular to the longitudinal direction of the apparatus body 2, i.e., the vertical direction when seen in FIG. 3. As shown in FIG. 11 and FIGS. 12(*a*), 12(*b*), the slide cam member 81 has a pressing portion 82 at one end near the resetting slider 72. The slide cam member 81 also has an arm 83 formed on the inner side of the pressing portion 82 to extend in a direction perpendicular to the longitudinal direction of the slide cam member 81 and toward the disk loading/unloading slot 6. On a side, opposite to the pressing portion 82, of the arm 83, there is formed a projecting pin 84.

Further, the slide cam member 81 is provided with a cam 85 having a cam surface 85*a*. The pin 20 of the first disk guide arm 11 comes in contact with the cam surface 85*a* so as to control the first disk guide arm 11, thereby subsidiarily achieving the more secure positioning of a large-diameter disk of 12 cm in diameter 7 (hereinafter, sometimes referred to as simply as a 12 cm disk) to the center without backlash. Furthermore, the slide cam member 81 is provided with a cam 86 having a cam surface 86*a*. The pin 20 of the first disk guide arm 11 comes in contact with the cam surface 86*a* so as to control the first disk guide arm 11. On the inner side, relative to the cams 85 and 86, of the slide cam member 81, there is formed a rack gear 87 facing toward the disk loading/unloading slot 6.

On the other hand, on the other end, opposite to the resetting slider 72, of the slide cam member 81, there is provided a cam 89 having a cam surface 88. The cam surface 88 comprises a first cam surface 88*a* which has a gentle inclination and a second cam surface 88*b* which is continued from the first cam surface 88*a* and extends substantially horizontally (in the longitudinal direction of the slide cam member 81).

When the second disk guide arm 12 holds the large-diameter 12 cm disk, the pin 32 of the second disk guide arm 12 first comes in contact with the first cam surface 88*a* so that the pivotal movement of the second disk guide arm 12 is controlled by the first cam surface 88*a*. Then, the pin 32 comes in contact with the second cam surface 88*b* so that the pivotal movement of the second disk guide arm 12 is controlled by the second cam surface 88*b*.

The cam 89 has a cam surface 90 which comprises a first cam surface 90*a* which has a gentle inclination, a second cam surface 90*b* which is continued from the first cam surface 90*a* and of which inclination is larger than that of the first cam surface 90*a*, and a third cam surface 90*c* which is continued from the second cam surface 90*b* and is inclined in a direction reversed from the direction of the inclination of the second cam surface 90*b* with a similar angle.

The pin 32 of the second disk guide arm 12 first comes in contact with the first cam surface 90*a* so that the pivotal movement of the second disk guide arm 12 is controlled by the first cam surface 90*a*. Then, the pin 32 comes in contact with the second cam surface 90*b* so that the pivotal movement of the second disk guide arm 12 is controlled by the second cam surface 90*b*. After the second disk guide arm 12 holds and sets the small-diameter 8 cm disk 7 to the centering position relative to the traverse unit 4, the pin 32 comes in contact with the third cam surface 90*c* so that the pivotal movement of the second disk guide arm 12 is controlled by the third cam surface 90*c* to move the second disk guide arm 12 to pivot in the counterclockwise direction so as to separate the disk guide portion 33 of the second disk guide arm 12 from the periphery of the 8 cm disk 7.

At the end, opposite to the resetting slider 72 side, of the slide cam member 81, there is provided a cam 91 having a slant cam surface 91*a* for controlling the closing motion of the shutter. The slant cam surface 91*a* slopes downwards inward from an end, opposite to the side near the resetting slider 72, of the slide cam member 81 when seen in FIG. 12(*a*), in other words, slops upwards when seen in FIG. 12(*b*).

As shown in FIGS. 12(*b*) and 12(*c*), the slide cam member 81 has a standing wall 92 which is formed to extend perpendicular to the face on which the arm 83, the cams 85 and 86, the rack gear 87, and the cam 89 are formed. In the standing wall 92, there are formed a pair of cam slots 93 and 94. The both cam slots 93 and 94 are composed of lower horizontal slots 93*a* and 94*a*, inclined slots 93*b* and 94*b* continued from the lower horizontal slots 93*a* and 94*a*, and upper horizontal slots 93*c* and 94*c* continued from the inclined slots 93*b* and 94*b* when seen in FIGS. 12(*b*) and 12(*c*), respectively. In this case, the inclined slots 93*b* and 94*b* are inclined leftwards from the left ends of the upper horizontal slots 93*c* and 94*c* to the right ends of the lower horizontal slots 93*a* and 94*a* when seen in FIG. 12(*c*), respectively. The width of the inclined slot 93*b* is set to be slightly larger than that of the inclined slot 94*b*, thereby preventing the movement of the traverse unit from being locked when the traverse unit is moved vertically.

The slide cam member 81 is always biased by a spring (not shown) toward the nonoperational position, i.e., onto the resetting slider 72 side (downwards when seen in FIG. 3). In addition, the resetting slider 72 is always biased by a spring toward the nonoperational position, i.e., leftwards when seen in FIG. 3 or upwards when seen in FIG. 11. Therefore, the resetting slider 72 presses the pressing column 68 of the trigger lever 64 upwards when seen in FIG. 11 so that the trigger lever 64 is biased in the counter-clockwise direction when seen in FIG. 3. Accordingly, the corner of the body 65 of the trigger lever 64 where the pressed column 67 is formed comes in contact with the side plate of the apparatus body 2 as shown in FIG. 3, thereby preventing the further rotation of the trigger lever 64 in the counter-clockwise direction. When the disk storage medium processing apparatus 1 is not in operation, the trigger lever 64, the resetting slider 72, and the slide cam member 81 are held in their nonoperational positions as shown in FIG. 3a and FIG. 11. A spring that biases the slide cam member 81 is not necessarily provided and can be omitted.

The trigger lever 64 is located at the nonoperational position, i.e. the lower position, in the vertical direction when seen in FIG. 9 when the first disk guide arm 11 is in the nonoperational position as shown in FIG. 3. As mentioned above, when the trigger lever 64 is in the nonoperational position in the vertical direction as well as the rotational direction and the disk holding arm 44 is in the nonoperational position as shown in FIG. 3, there is a predetermined space α set in the rotational direction between the first pressing portion 52 of the disk holding arm 44 and the pressed column 67 of the trigger lever 64. When the small-diameter 8 cm disk 7 is inserted and the disk holding arm 44 pivots a predetermined amount, the space α is cancelled so that the first pressing portion 52 and the pressed column 67 come in contact with each other. Further, when the trigger lever 64 and the disk holding arm 44 are in the nonoperational positions as mentioned above, there is a predetermined space β set in the rotational direction between the second pressing portion 53 and the pressed column 67. The space β is larger than the space α. When the large-diameter 12 cm disk is inserted and the disk holding arm 44 pivots a predetermined amount which is larger than that in the case of the small-diameter 8 cm disk 7, the space β is cancelled so that the second pressing portion 53 and the pressed column 67 of the raised trigger lever 64 come in contact with each other.

The different spaces α and β are set for the small-diameter 8 cm disk 7 and the large-diameter 12 cm disk 7, respectively as mentioned above, whereby trigger (timing) for starting the movement of the slide cam member 81 is set for the small-diameter disk 7 and the large-diameter disk 7, respectively so that the centering control of the disk 7 by the slide cam member 81 can be conducted in the same way even when the disk 7 is a small-diameter disk or a large-diameter disk. Accordingly, the moving amount of the disk holding arm 44, the single trigger lever 64, and the single slide cam member 81 cooperate together to achieve the centering of the disk whether the disk has the small diameter or the large diameter.

When the slide cam member 81 is in the nonoperational position as shown in FIG. 11, the pin 55a of the disk holding arm 44 and the pressing portion 82 of the slide cam member 81 are spaced from each other. In addition, the pin 84 of the slide cam member 81 is in contact with the lower end of the first cam groove portion 77b of the cam groove 77a of the resetting slider 72.

Figure 13:
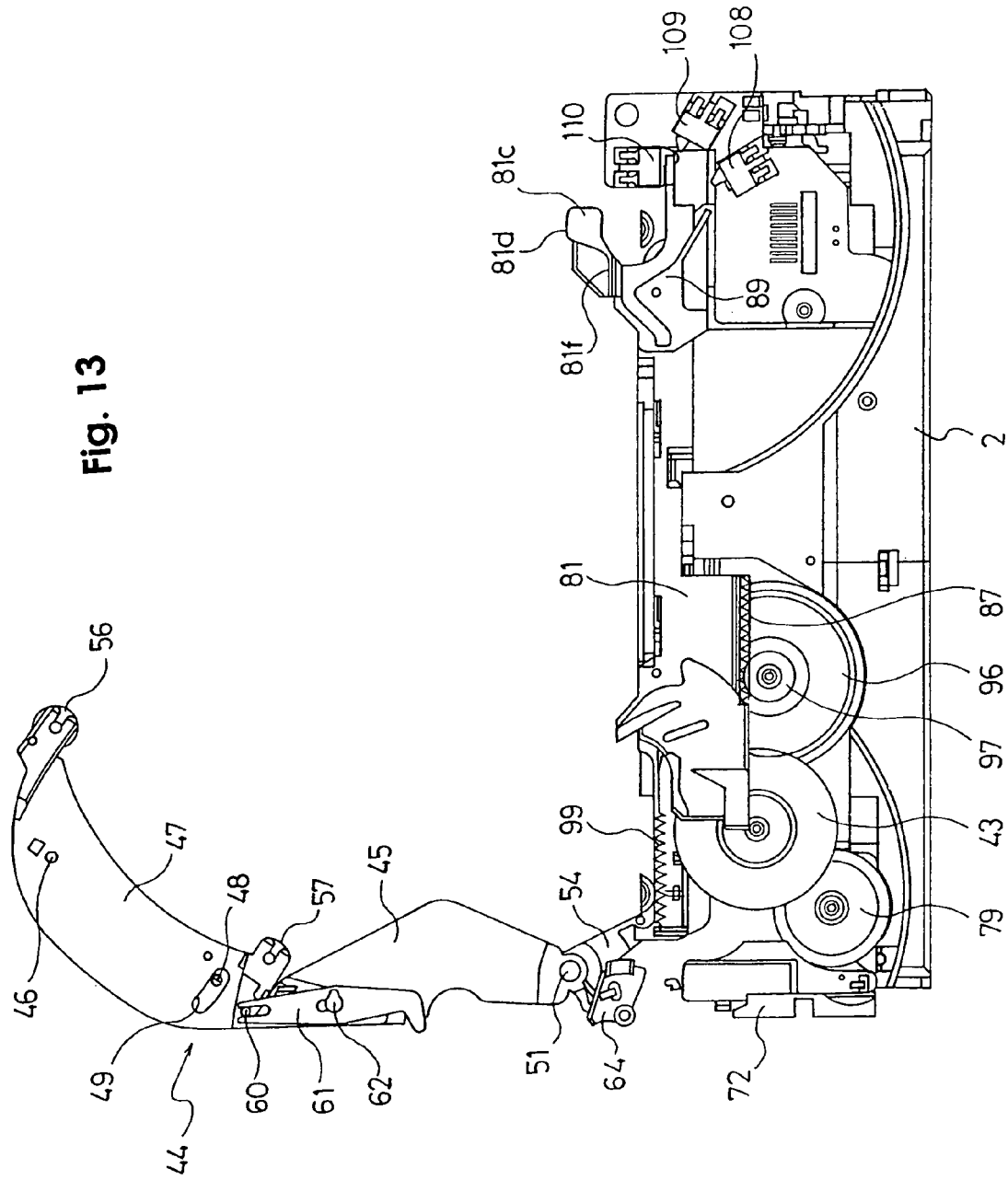
FIG. 13 is an illustration for explaining the relation between the slide cam member and a slide cam member driving gear.

As shown in FIG. 13, on the apparatus body 2, a gear 96 always meshing with the intermediate gear 43 is rotatably disposed and a slide cam member driving gear 97 of which diameter is smaller than that of the gear 96 is disposed coaxially with the gear 96 such that the slide cam member driving gear 97 can rotate together with the gear 96. The rack gear 87 of the slide cam member 81 can mesh with the slide cam member driving gear 97. The rack gear 87 shown in FIG. 13 is in a state meshing with the slide cam member driving gear 97. FIG. 13 shows the state where the slide cam member 81 is in operation. On the other hand, when the slide cam member 81 is in the nonoperational position, the rack gear 87 does not mesh with the slide cam member driving gear 97 and is positioned on the left of the slide cam member driving gear 97 when seen in FIG. 13.

Figure 14:
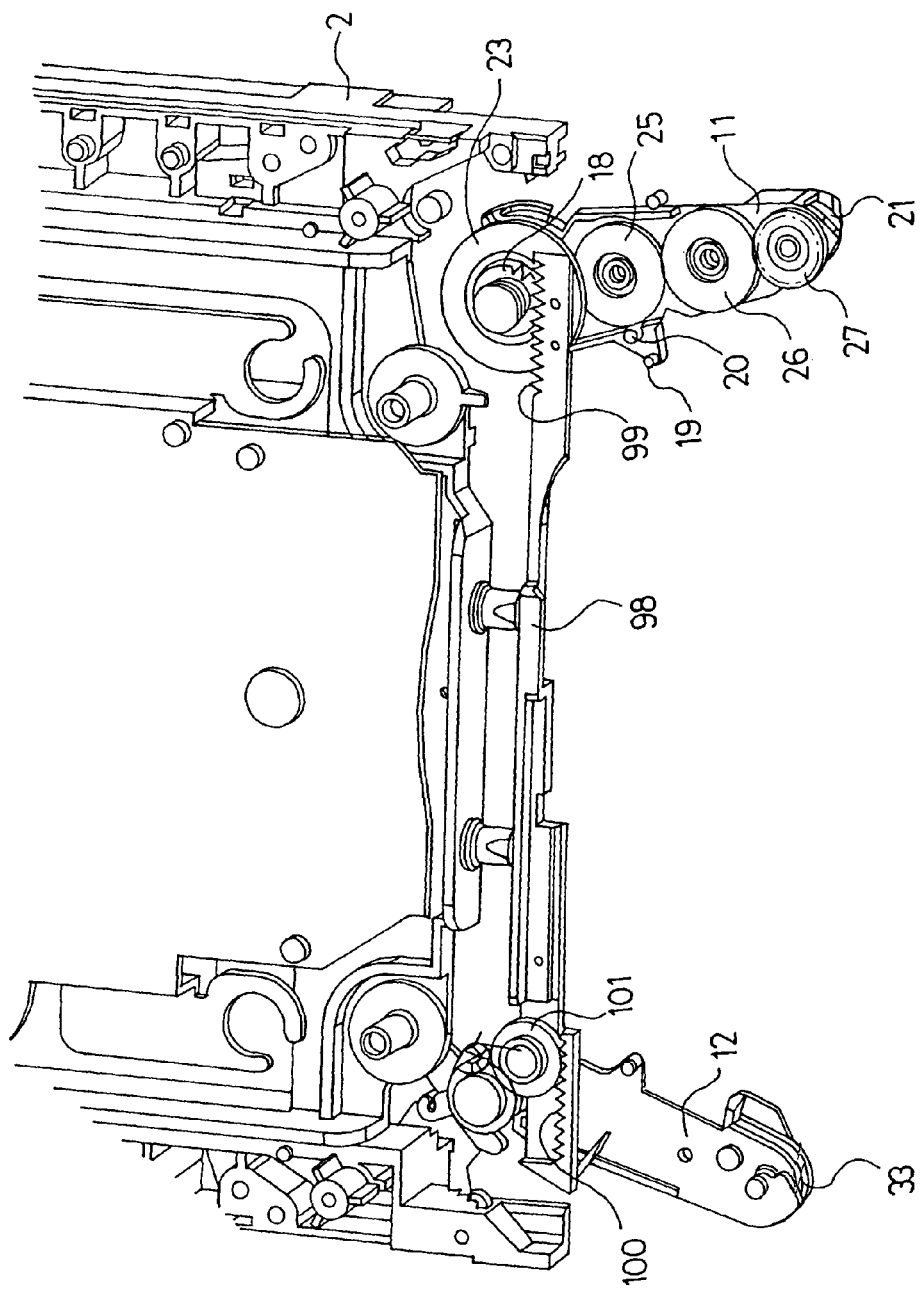
FIG. 14 is a partial bottom view for explaining the synchronism between the first disk guide arm and the second disk guide arm.

As shown in FIG. 14, an arm synchronous member 98 as an arm synchronous means is disposed such that it can move in a direction perpendicular to the longitudinal direction. On the both ends of the arm synchronous member 98, there is provided rack gears 99 and 100, respectively. The rack gear 99 as one of the rack gears always meshes with the gear 18 of the first disk guide arm 11, while the other rack gear 100 always meshes with a gear 101 which is rotatably supported on the apparatus body 2. The gear 101 always meshes with the gear 30 of the second disk guide arm 12. Therefore, by the arm synchronous member 98, the first and second disk guide arms 11 and 12 are synchronized with each other so as to pivot in opposite directions. In this regard, when the disk storage medium processing apparatus 1 is not in operation, the pin 19 (FIG. 4(c)) projecting downwards from the first disk guide arm 11 is in contact with a stopper 81b (shown in FIG. 12(b)) of the slide cam member 81 so that the first disk guide arm 11 is held in its nonoperational position shown in FIG. 3. Because of the aim synchronous member 98, the second disk guide arm 12 is also held in its nonoperational position shown in FIG. 3. The arm synchronous member 98 is supported such that it can slide relative to a groove 104 which is formed adjacent to a bottom wall 103, on which the arm 83 is formed, of the slide cam member 81 shown in FIG. 12(a). As shown in FIG. 3, an assist lever 105 for assisting the centering of the small-diameter 8 cm disk 7 is pivotably supported by the rotary shaft 28 of the apparatus body 2. The assist lever 105 is always biased by a spring (not shown) in the counter-clockwise direction when seen in FIG. 3. The assist lever 105 has a pin 106 which is formed at a tip end of the assist lever 105. The pin 106 can come in contact with the periphery of the small-diameter 8 cm disk 7. When the disk storage medium processing apparatus 1 is not in operation, one side 105a of the assist lever 105 is in contact with a stopper 81c of the slide cam member 81 so that the assist lever 105 is held in its nonoperational position. It should be noted that the assist lever 105 may have a guide pin on an end opposite to the pin 106 and the apparatus body 2 may be provided with a guide groove for guiding the guide pin so that the guide pin and the guide groove cooperate together to hold the assist lever 105 in its nonoperational position.

Figure 18:
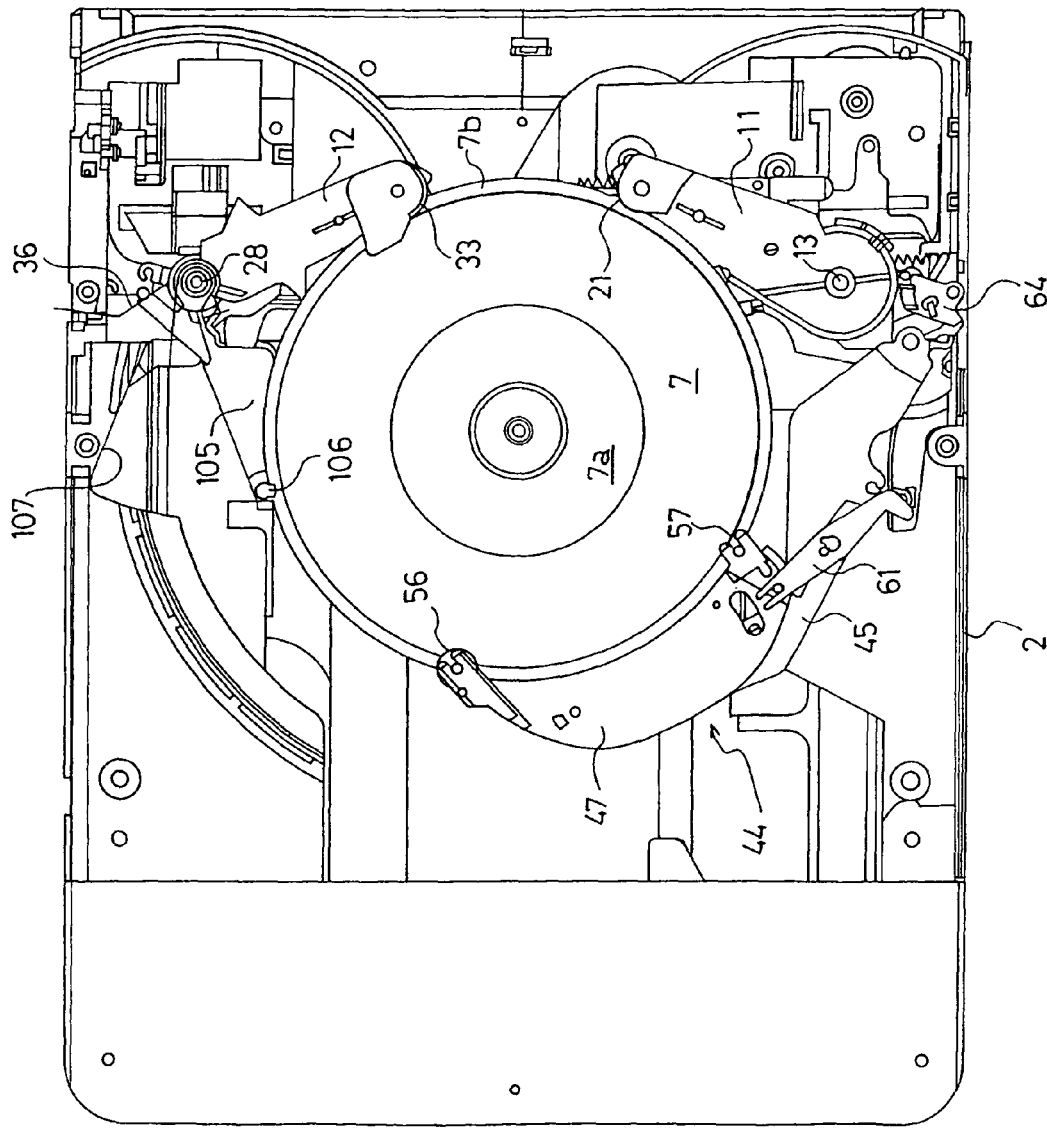
FIG. 18 is a plan view showing a state where a small-diameter disk of 8 cm in diameter is centered.

When the small-diameter 8 cm disk 7 is set in the centering position as shown in FIG. 18, another side 105b, which extends in a direction substantially perpendicular to the side 105a, of the assist lever 105 is in contact with a stopper 81d of the slide cam member 81, whereby the assist lever 105 is stably held in its centering setting position.

On the other hand, the apparatus body 2 has a refuge portion 107 for the assist lever 105 as shown in FIG. 18 (as will be described later). In case of the large-diameter 12 cm disk, the slide corn member 7 moves largely the stopper 81c presses an aim portion 105c of the assist lever 105 so that the assist lever 105 moves into (is received in) the refuge portion 107. When the assist lever 105 is placed in the refuge portion 107, the pin 106 is spaced away from the periphery of the large-diameter 12 cm disk 7.

Figure 15:
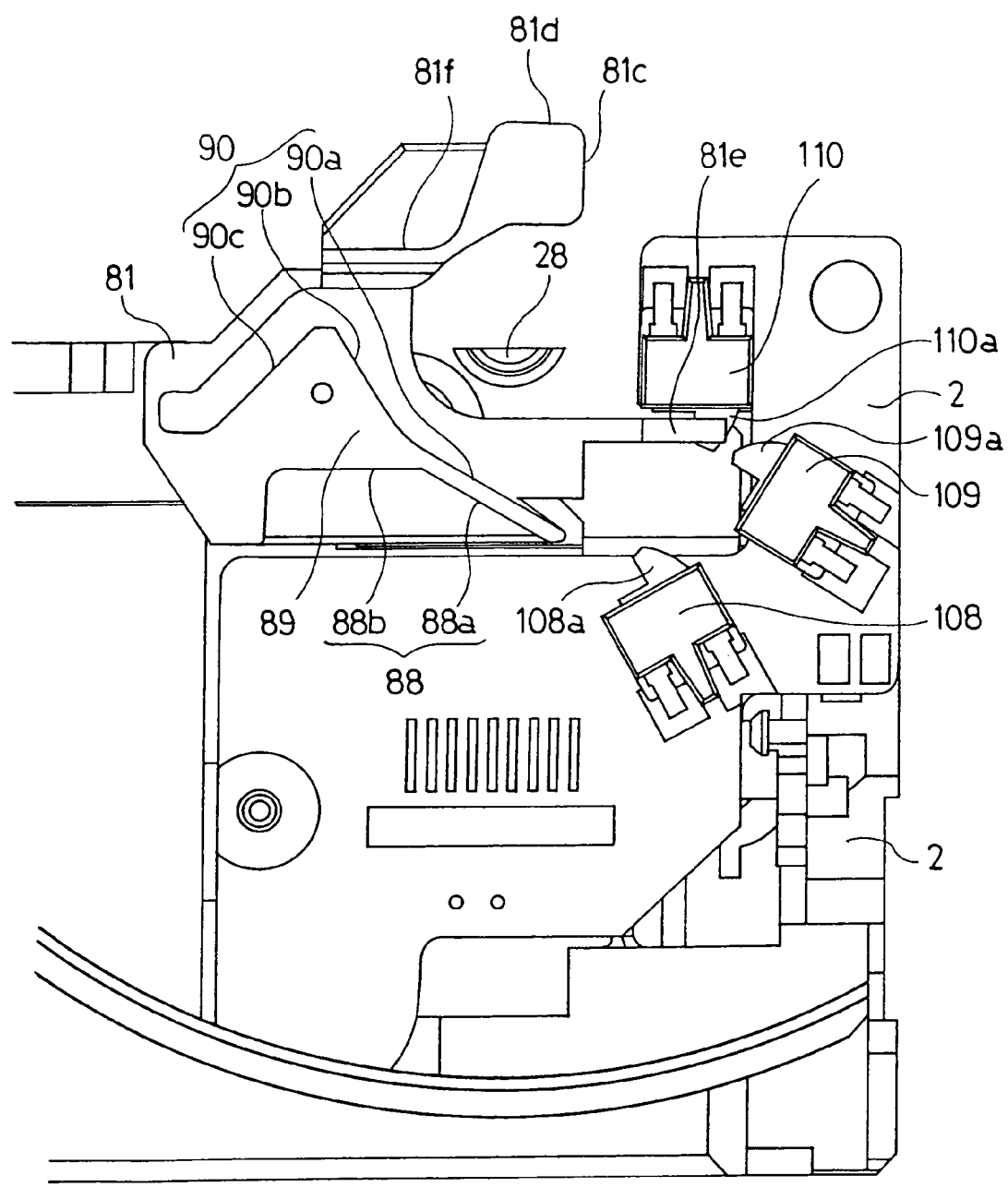
FIG. 15 is a partial plan view showing three switches.

As shown in FIG. 3 and FIG. 15, the apparatus body 2 has three switches, i.e., first through third switches 108, 109, and 110. The first switch 108 is a switch for detecting the small-diameter 8 cm disk 7, the second switch 109 is a switch for detecting the large-diameter 12 cm disk 7, and the third switch 110 is a switch for detecting when the small-diameter or large-diameter disk 7 is clamped by the traverse unit. In this regard, the first and second switches 108 and 109 have actuators 108a and 109a, respectively. Each of the first and second switches 108 and 109 is turned on when the corresponding actuator 108a, 109a is pressed by the switch actuator 31 of the second disk guide arm 12 and the third switch 110 is turned on when its actuator is pressed by the switch actuator 81e of the slide cam member 81.

Figure 16:
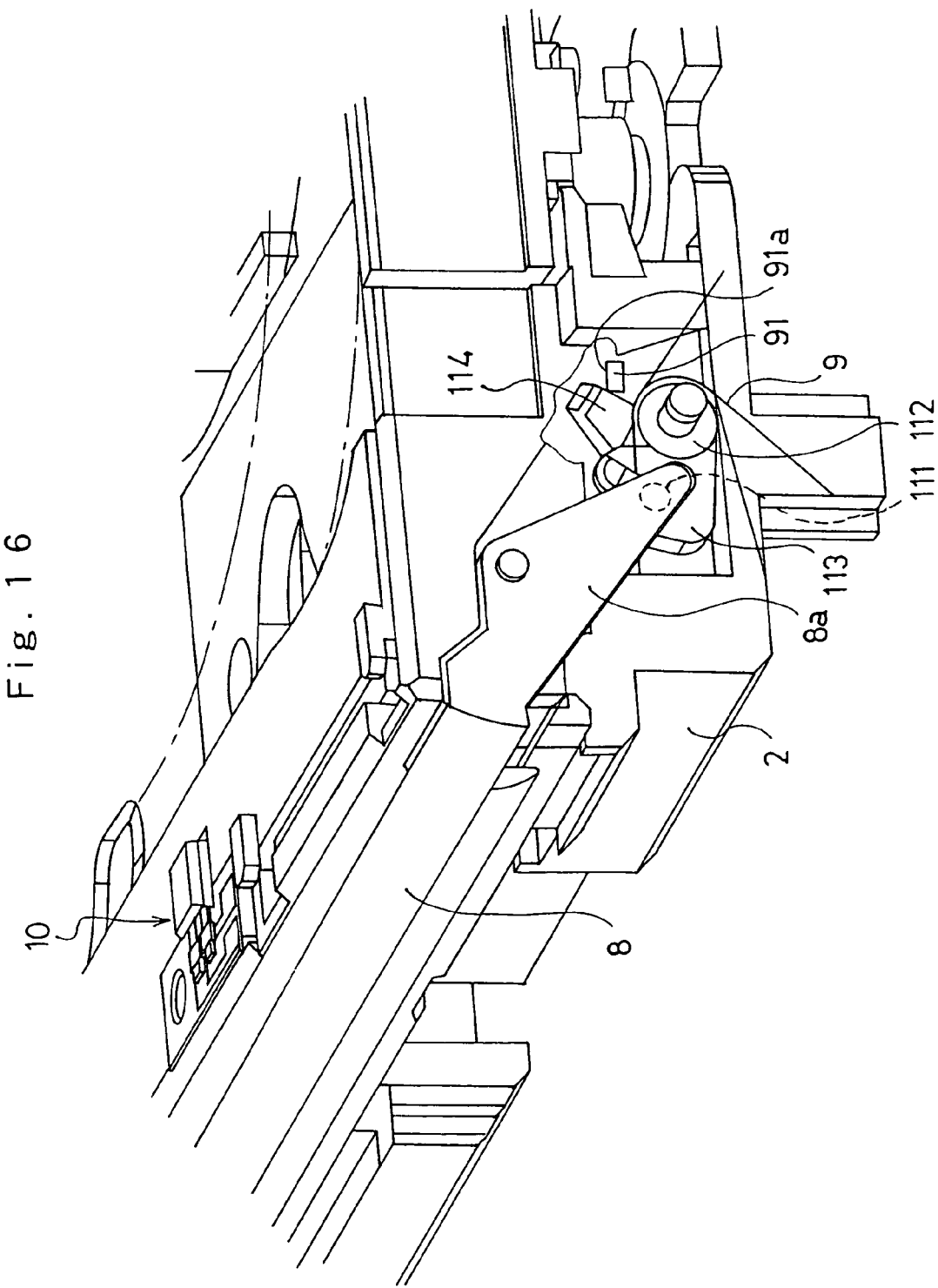
FIG. 16 is a partial perspective view partially showing a closing mechanism of a shutter.

As shown in FIG. 2, the shutter 8 has both side arms 8a and 8b which are pivotably attached to the apparatus body 2. As shown in FIG. 16, the arm 8a has a projecting pivot shaft 111. The apparatus body 2 has a closing control member 112 which is rotatably attached to the apparatus body 2. The closing control member 112 is always biased by the gate control spring 9 in the clockwise direction when seen in FIG. 16. The closing control member 112 has two arms 113 and 114. One of the arms 113 is engaged with the pivot shaft 111 such that, when the closing control member 112 rotates, the shutter 8 pivots in the opposite direction. The other arm 114 can come in contact with the cam surface 91a of the cam 91 of the slide cam member 81. FIG. 16 shows the state where the closing control member 112 rotates in the counter-clockwise direction by the cam 91 so that the shutter 8 is closed to cover the disk loading/unloading slot 6. When the disk storage medium processing apparatus 1 is not in operation, the closing control member 112 is not in contact with the cam 91 and is set by the gate control spring 9 to be located at a position after rotated by in the clockwise direction so that the shutter 8 is opened not to cover the disk loading/unloading slot as shown in FIG. 2(a).

Figure 17A:
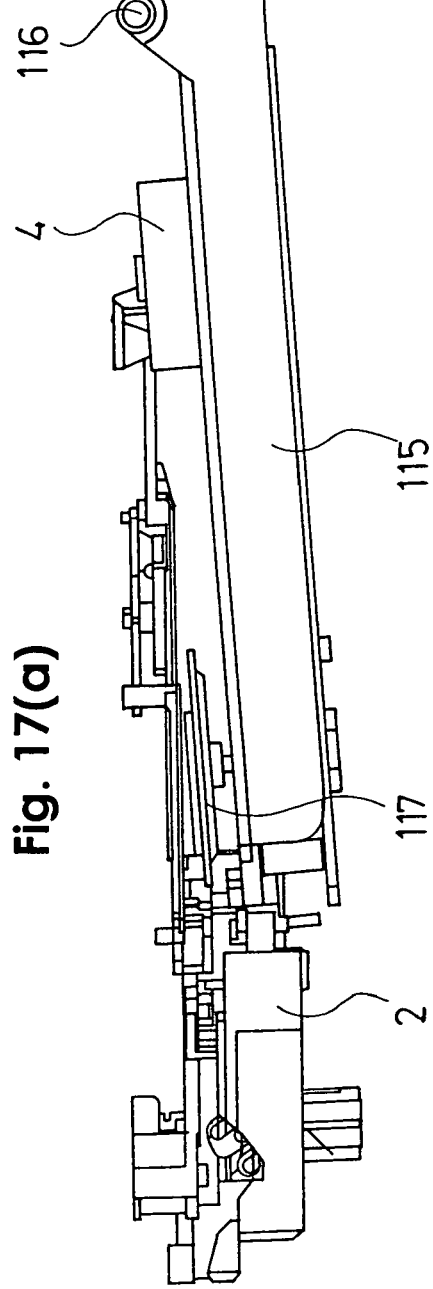
Figure 17B:
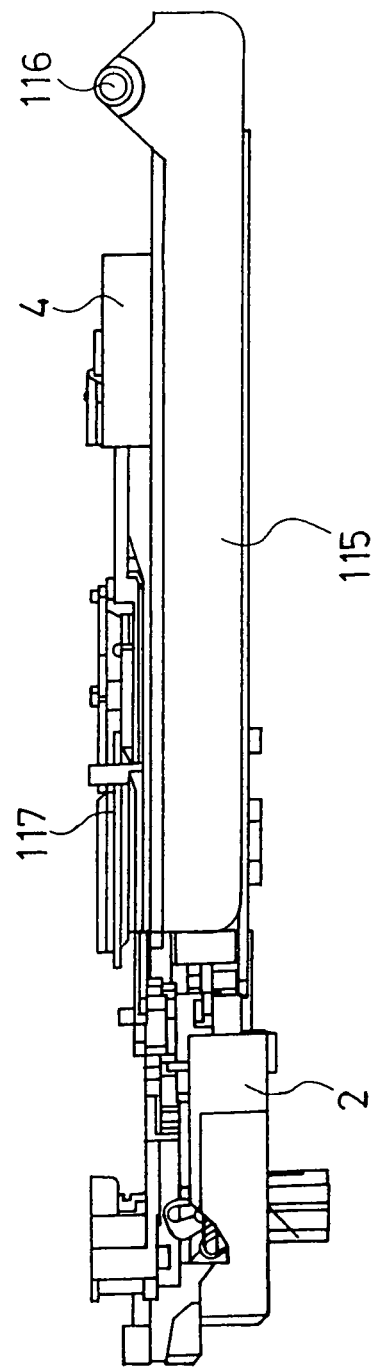

As shown in FIGS. 17(a) and 17(b), the traverse unit 4 is supported by a traverse unit supporting member 115. The traverse unit supporting member 115 is pivotably attached at its one end to the apparatus body 2 by a pivot shaft 116. The traverse unit 4 is disposed on the other end of the traverse unit supporting member 115 and is provided with a turn table 117.

Figure 12C:
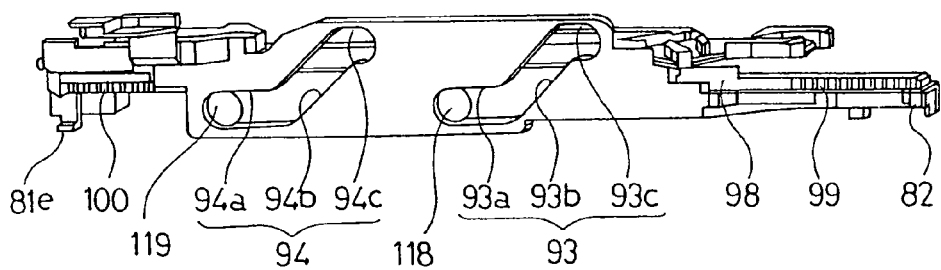

On the other end (the left end when seen in FIGS. 17(a) and 17(b)) of the traverse unit supporting member 115, there are formed a pair of projecting pins 118 and 119 (shown in FIG. 12(c), not shown in FIG. 17(a) nor FIG. 17(b)). As shown in FIG. 12(c), the projecting pins 118 and 119 are fitted into the cam slots 93 and 94, respectively. In this regard, when the disk storage medium processing apparatus 1 is not in operation as shown in FIG. 17(a), the projecting pins 118 and 119 are located at the left ends of the lower horizontal slots 93a and 94a of the cam slots 93 and 94, respectively as shown in FIG. 12(c). In this state, the traverse unit 4 is moved to pivot in the counter-clockwise direction so that the other end side of the traverse unit 4 is set at its lower position by a stopper (not shown) formed on the apparatus body 2 as shown in FIG. 17(a)

Hereinafter, the action of the disk storage medium processing apparatus 1 of this embodiment having the aforementioned structure will be described. When the disk storage medium processing apparatus 1 is not in operation, that is, when no disk 7 is loaded, all components of the disk storage medium processing apparatus 1 such as the first and second disk guide arms 11 and 12, the disk holding arm 44, the trigger lever 64, the resetting slider 72, and the slide cam member 81 are in their nonoperational positions as shown in FIG. 3 and FIG. 9. At this point, the disk holding arm 44 is in the bent state where the holding arm body 45 and the holding assist arm 47 form a slight angle therebetween as shown by solid lines in FIG. 7(b). The shutter 8 is set in the opened state where the disk loading/unloading slot 6 is not covered as shown in FIG. 2(a). The traverse unit 4 is set in the lowered position as shown in FIG. 17(a). In addition, the main power of the disk storage medium processing apparatus 1 is turned on.

When the disk storage medium processing apparatus 1 is in the aforementioned nonoperational state, a user inserts a portion of the small-diameter 8 cm disk 7 into the apparatus body 2 through the disk loading/unloading slot 6 from the right hand side when seen in FIG. 3. Then, the disk sensor 10 detects the disk 7, whereby the driving motor 37 is driven to rotate by a controller (not shown) of the disk storage medium processing apparatus 1. By the rotation of the driving motor 37, the disk driving roller 21 of the first disk guide arm 11 is rotated in the counter-clockwise direction when seen in FIG. 3, i.e., in such a direction as to draw the disk 7 to the centering position, through the endless belt 41, the worm 38, the worm wheel 42, the intermediate gear 43, the first through fourth gears 23, 24, 25, 26, and 27.

The periphery of the disk 7 of which portion is inserted through the disk loading/unloading slot 6 comes in contact with the disk driving roller 21 and the disk guide portion 33, and the disk 7 is therefore sandwiched between the disk driving roller 21 and the disk guide portion 33. Then, according to the rotation of the disk driving roller 21 and the friction with the disk guide portion 33, the disk 7 rotates on a contact point with the disk guide portion 33 as a point of support and rolls along the groove of the disk guide portion 33, whereby the disk 7 is moved toward the centering position. Since the biasing force of the first disk guide arm 11 is set to be more than the biasing force of the second disk guide arm 12, the small-diameter 8 cm disk 7 inserted is held in the biased state by the disk guide portion 33 of the second disk guide arm 12.

Since the distance between the disk driving roller 21 and the disk guide portion 33 is smaller than the diameter of the disk 7, the first and second disk guide arms 11 and 12 are pivotally moved by the disk 7 in directions apart from each other (the first disk guide arm 11 pivots in the clockwise direction when seen in FIG. 3 and the second disk guide arm 12 pivots in the counter-clockwise direction when seen in FIG. 3). During this, the first and second disk guide arms 11 and 12 are synchronized with each other to pivot by the arm synchronous member 98. Accordingly, the pair of the arms 11 and 12 can bring the disk 7 into the apparatus body stably by holding the disk 7.

As the disk 7 is drawn a predetermined amount, the periphery of the disk 7 comes in contact with the disk holding roller 56 as one of the rollers of the disk holding arm 44 and then presses the disk holding roller 56 leftwards when seen in FIG. 3. Accordingly, the disk holding arm 44 pivots in the counter-clockwise direction when seen in FIG. 3. As the disk holding arm 44 pivots a predetermined amount, the first pressing portion 52 of the disk holding arm 44 also pivots in the counter-clockwise direction, comes in contact with the pressed column 67 of the trigger lever 64, and presses the pressed column 67. Accordingly, the trigger lever 64 pivots in the clockwise direction when seen in FIG. 3 and the pressing column 68 presses the resetting slider 72 rightwards when seen in FIG. 3 so that the resetting slider 72 moves straight rightwards. By the rightward movement of the resetting slider 72, the first cam groove portion 77b of the cam groove 77a of the resetting slider 72 moves straight relative to the pin 84 of the slide cam member 81. Therefore, at this point, the pin 84 is not pressed by the first cam groove portion 77b so that the slide cam member 81 is still maintained in the nonoperational position.

As the resetting slider 72 further moves rightwards when seen in FIG. 3, the rack gear 76 of the resetting slider 72 meshes with the resetting slider driving gear 80. At this point, the resetting slider driving gear 80 is rotated by the rotation of the driving motor 37. Therefore, by the rotational force of the driving motor 37, the resetting slider 72 starts to move rightwards. When the rack gear 76 starts to mesh with the resetting slider driving gear 80, the pin 84 is positioned at the boundary between the first cam groove portion 77b and the second cam groove portion 77c.

By the rightward movement of the resetting slider 72 by the rotational force of the driving motor 37, the pin 84 of the slide cam member 81 is pressed by the second cam groove portion 77c in a direction perpendicular to the moving direction of the resetting slider 72, i.e., in an upward direction perpendicular to the longitudinal direction of the apparatus body 2 when seen in FIG. 3, whereby the slide cam member 81 starts to move in the same direction.

As the slide cam member 81 further moves upwards, the rack gear 87 of the slide cam member 81 meshes with the slide cam member driving gear 97. At this point, since the slide cam member driving gear 97 is rotated by the rotation of the driving motor 37, the slide cam member 81 starts to move upwards by the rotation of the driving motor 37. In addition, the pin 84 is positioned in the third cam groove portion 77d and the rack gear 76 of the resetting slider 72 comes off the resetting slider driving gear 80 so that the resetting slider 72 is maintained in the position.

Because of the upward movement of the slide cam member 81, the assist lever 105 is pressed upwards, when seen in FIG. 3, by the slide cam member 81 through the stopper 81c so that the assist lever 105 starts to pivot in the clockwise direction. By the upward movement of the slide cam member 81, the stopper 81b of the slide cam member 81 is positioned not to touch the pin 19 of the first disk guide arm 11. By the pivotal movement of the second disk guide arm 12 in the counter-clockwise direction, the second disk guide arm 12 moves to a position where the pin 32 is allowed to enter the cam face 90. By the pivotal movement of the second disk guide arm 12 for a predetermined amount in the counter-clockwise direction, the switch actuator 31 presses the actuator 108a of the first switch 108 so as to turn on the first switch 108.

As the maximum diameter portion of the 8 cm disk 7 passes between the disk driving roller 21 and the disk guide portion 33, the first and second disk guide arms 11 and 12 start to pivot in the reverse closing directions, that is, the first disk guide arm 11 start to pivot in the counter-clockwise direction and the second disk guide arm 12 starts to pivot in the clockwise direction. Because of the pivotal movement of the second disk guide arm 12 in the clockwise direction and the upward movement of the slide cam member 81, the pin 32 enters in the cam face 90.

During this, the periphery of the disk 7 are in contact with the driving roller 21 and the disk guide portion 33 so that the first and second disk guide arm 11 and 12 hold the disk 7. When the first and second disk guide arms 11 and 12 start to pivot in the closing directions, the movement of second disk guide arm 12 in the counter-clockwise direction is not so large that the switch actuator 31 does not press the actuator 109a of the second switch 109 so that the second switch 109 is not turn on yet. As the second disk guide arm 12 pivots a predetermined amount in the clockwise direction, the switch actuator 31 is spaced apart from the actuator 108a of the first switch 108 so as to turn off the first switch 108.

As the disk 7 moves toward the centering position, the periphery of the disk 7 comes in contact with the pin 106 of the assist lever 105 so that the assist lever 105 is moved by the disk 7 to pivot in the clockwise direction.

As the 8 cm disk comes closer to the centering position, the slide cam member 81 is about to reach the movement limit position thereof. Then, the cam face 91a of the slide cam member 81 comes in contact with the arm 114 of the closing control member 112 so that the closing control member 112 pivots in such a direction of closing the shutter 8 to cover the disk loading/unloading slot 6. The pair of the projecting pins 118 and 119 of the traverse unit supporting member 115 move from the lower horizontal slots 93a and 94a to the inclined slots 93b and 94b of the cam slots 93 and 94 and the traverse unit supporting member 115 pivots about the pivot shaft 116 in the clockwise direction when seen in FIG. 17(a). Accordingly, the traverse unit 4 gradually moves upwards and come very close to the upper position as shown in FIG. 17(b).

By further pivotal movement of the disk holding arm 44 in the counter-clockwise direction, the holding assist arm 47 pivots relative to the holding arm body 45, whereby the 8 cm disk 7 is placed to the centering position with keeping the periphery of the disk 7 to be held by the disk driving roller 21, the disk guide portion 33, and the disk holding rollers 56 and 57. As the 8 cm disk 7 is placed in the centering position as shown in FIG. 3, the pin 106 of the assist lever 105 comes in contact with the periphery of the disk 7 as shown in FIG. 18. When the 8 cm disk 7 is set in the centering portion as shown in FIG. 3 in this manner, the periphery of the disk 7 is held at four points by the disk driving roller 21, the disk guide portion 33, and the two disk holding rollers 56 and 57 and is also supported by the pin 106. Therefore, the 8 cm disk is held stably in three dimensions, i.e. X-Y-Z directions. The assist lever 105 is stably held in the centering position because the side 105b of the assist lever 105 comes in contact with the stopper 81d of the slide cam member 81.

As the slide cam member 81 further moves, the pair of the projecting pins 118 and 119 of the traverse unit supporting member 115 moves to the upper horizontal slots 93c and 94c of the cam slots 93 and 94, respectively. As the traverse unit supporting member 115 further rotates in the clockwise direction, the traverse unit 4 is set in the upper position as shown in FIG. 17(b) where the 8 cm disk is clamped between the clamper of the clamper supporting member 5 and the turn table 117. Since the actuator 110a of the third switch 110 is pressed by the switch actuator 81e of the slide cam member 81 when the 8 cm disk 7 is clamped as mentioned above, the third switch 110 is turned on. Therefore, the controller stops the driving motor 37 so that the slide cam member 81 is stopped.

Because of the movement of the slide cam member 81 from the centering of the disk 7 to the clamping of the disk 7, the assist lever 105 is moved by the stopper 81c to pivot in the clockwise direction so that the pin 106 is spaced apart from the peripheral surface of the disk 7. In addition, the pin 32 of the second disk guide arm 12 is moved by the third cam face 90c of the slide cam member 81, whereby the second disk guide arm 12 slightly pivots in the counter-clockwise direction when seen in FIG. 18 so that the disk guide portion 33 is spaced apart from the periphery of the disk 7. Because of the pivotal movement of the second guide arm 12 in the counter-clockwise direction, the first disk guide arm 11 is moved through the synchronous member 98 to pivot in the clockwise direction so that the disk driving roller 21 is spaced apart from the periphery of the disk 7. The pressing portion 82 of the slide cam member 81 comes in contact with the pin 55a of the disk holding arm 44 and then presses the pin 55a, whereby the disk holding arm 44 is slightly moved to pivot in the counter-clockwise direction when seen in FIG. 18 so that the disk holding rollers 56 and 57 are both spaced apart from the periphery of the disk 7. In this manner, the 8 cm disk clamped with the turn table 117 of the traverse unit 4 is allowed to freely rotate, thereby allowing recording or reproduction of information onto or from the 8 cm disk 7. In addition, the shutter 8 is closed by the cam face 91a to cover the disk loading/unloading slot 6 as shown in FIG. 2(b).

To unload the 8 cm disk 7 from the disk storage medium processing apparatus 1 after the recording or reproduction of information onto or from the disk 7, an eject button (not shown) mounted on the apparatus body 2 is depressed. Accordingly, the controller drives the driving motor 37 to rotate in the reverse direction opposite to that in the aforementioned case. Then, the disk driving roller 21 is rotated in such a direction as to eject the disk 7 and the slide cam member 81 moves straight downwards when seen in FIG. 18, i.e., in the direction opposite to that in the aforementioned case. By the third cam face 90c of the slide cam member 81, the first and second disk guide arms 11 and 12 are moved to pivot in the closing directions so that the disk driving roller 21 and the disk guide portion 33 come in contact with the periphery of the disk 7 so as to hold the periphery of the disk 7. Since the pressing portion 82 of the slide cam member 81 is spaced apart from the pin 55a of the disk holding arm 44, the disk holding aim 44 is moved to pivot in the clockwise direction when seen in FIG. 18 by the biasing force of the spring acting on the disk holding arm 44 in the direction toward the non-operational position and the pressing force of the pressing portion 81g of the slide cam member 81 which comes in contact with the pin 55b of the disk holding arm 44 and presses the pin 55b. Accordingly, the disk holding rollers 56 and 57 both come in contact with the periphery of the disk 7 and hold the disk 7. Since the stopper 81c of the slide cam member 81 is spaced apart from the assist lever 105, the assist lever 105 is moved to pivot in the counter-clockwise direction when seen in FIG. 18 by the biasing force acting on the assist lever 105 so that the pin 106 comes in contact with the periphery of the disk 7 to support the disk 7. In this manner, the 8 cm disk 7 can be held stably.

Then, by the movement of the slide cam member 81, the pair of the projecting pins 118 and 119 of the traverse unit supporting member 115 move to the inclined slots 93b and 94b of the cam slots 93 and 94, respectively so that the traverse unit supporting member 115 is moved to pivot about the pivot shaft 116 in the counter-clockwise direction when seen in FIG. 17(b). Accordingly, the traverse unit 4 gradually moves downwards so as to release the disk 7 from being clamped (i.e., unclamp the disk 7). Since the cam face 91a moves away according to the movement of the slide cam member 81, the shutter 8 is moved by the biasing force acting on the shutter 8 so as to pivot in the opening direction to uncover the disk loading/unloading slot 6.

By further movement of the slide cam member 81, the first and second disk guide arms 11 and 12 are moved to pivot in the opening directions and the disk holding arm 44 is further moved to pivot in the clockwise direction, whereby the disk 7 is moved rightwards when seen in FIG. 18 while the disk 7 is held by the disk driving roller 21, the disk guide portion 33, and the disk holding rollers 56 and 57. Since the disk driving roller 21 is rotated in the reverse direction opposite to that in the aforementioned case, the disk 7 is moved rightwards also by the rotation of the disk driving roller 21.

As the slide cam member 81 further moves downwards when seen in FIG. 3, the pin 84 thereof is positioned within the second cam groove portion 77c and the pin 84 presses the resetting slider 72 upwards when seen in FIG. 11 to move the resetting slider 72. Therefore, the rack gear 76 of the resetting slider 72 meshes with the resetting slider driving gear 80. At this point, the rack gear 87 of the slide cam member 81 comes off the slide cam member driving gear 97. However, the reverse rotation of the driving motor 37 makes the resetting slider driving gear 80 to rotate in the reverse direction opposite to that in the aforementioned case. Therefore, via the rack gear 76 meshing with the resetting slider driving gear 80, the resetting slider 72 is moved leftwards when seen in FIG. 18 and the trigger lever 64 is moved to pivot in the counter-clockwise direction.

As the second disk guide arm 12 is moved to pivot in the opening direction (i.e., the counter-clockwise direction), the switch actuator 31 turns on the first switch 108.

As the maximum diameter portion of the 8 cm disk 7 passes between the disk driving roller 21 and the disk guide portion 33, the second disk guide arm 12 starts to pivot in the closing direction (i.e., the clockwise direction). As the second disk guide arm 12 pivots a predetermined amount in the closing direction, the switch actuator 31 is spaced apart from the first switch 108 so as to turn off the first switch 108. According to the ON/OFF of the switch 108, the controller stops the driving motor 37. Therefore, the rightward movement of the disk 7 (i.e., in the unloading direction) is stopped. At this point, a portion of the disk 7, i.e., the half or more of a central portion 7a (shown in FIG. 18) of the disk 7 is out of the apparatus body through the disk loading/unloading slot 6. In this case, the non-recordable portion 7b (shown in FIG. 18) at the periphery of the disk 7 is held by the linear pinching groove of the linear guide holding portion 35 so that the disk 7 is stably held. In this state of the disk 7, a user catches the central portion 7a which is a non-recordable portion of the disk 7 with his or her fingers to pull out the disk 7 from the aperture body 2. In this manner, the 8 cm disk 7 is taken out of the disk storage medium processing apparatus 1.

After the 8 cm disk 7 is taken out, all of the components such as the shutter 8, the first and second disk guide arms 11 and 12, the disk holding arm 44, the trigger lever 64, the resetting slider 72, and the slide cam member 81 are set to their nonoperational positions as shown in FIG. 3 and FIG. 9 by the biasing force acting on themselves.

Hereinafter, the actions of loading and unloading a large-diameter 12 cm disk into or from the apparatus body 2 will be described. The actions are mostly the same as the actions of loading and unloading the small-diameter 8 cm disk. Therefore, the description will be made as regard to points different from the actions of loading and unloading the 8 cm disk 7.

As the 12 cm disk 7 is inserted into the apparatus body 2 through the disk loading/unloading slot 6 from the right hand side when seen in FIG. 3, the driving motor 37 is driven to rotate, whereby the disk driving roller 21 is rotated so as to draw the 12 cm disk 7 into the apparatus body. Then because of the bias of the disk 7, the periphery of the disk 7 is sandwiched between the slant face 6b and the horizontal face 6h of the disk holding portion 6j, on the second disk guide arm 12 side, of the disk loading/unloading slot 6. Since the periphery of the disk 7 is held in this manner, the attitude of the disk 7 during insertion can be maintained to extend along the insertion direction. Therefore, the disk 7 can be inserted into the apparatus body 2 through the disk loading/unloading slot 6 with maintaining stable attitude. The first and second disk guide arms 11 and 12 pivot in the opening directions. Since the diameter of the 12 cm disk 7 is larger than the diameter of the 8 cm disk, the first and second disk guide arms 11 and 12 pivot in the opening directions largely as compared to the case of the 8 cm disk 7. Then, the cam face 16a of the cam 16 of the first disk guide arm 11 comes in contact with the cam contact portion 69 of the trigger lever 64 so as to press the trigger lever 64 upwards when seen in FIG. 9 against the spring force of the coil spring 71. Accordingly, the pressed column 67 also moves upwards so that the pressed column 67 does not come in contact with the first pressing portion 52 of the disk holding arm 44 and is set to such a position that the pressed column 67 is allowed to come in contact with the second pressing portion 53. Therefore, in case of the 12 cm disk 7, the disk holding arm 44 pivots largely as compared to the case of the 8 cm disk 7 so that the second pressing portion 53 comes in contact with the pressed column 67 so as to start the pivotal movement of the trigger lever 64. That is, in case of the 12 cm disk 7, trigger is set such that the slide cam member starts to operate (move) after the disk holding arm 44 pivots largely. Since the amount of the pivotal movement of the disk holding arm 44 for stating the operation of the slide cam member 81 is set to be different as mentioned above, the control for centering the 12 cm disk 7 after the start of operation of the slide cam member 81 can be the same as the case of the 8 cm disk 7.

Since the second disk guide arm 12 pivots in the opening direction largely, the switch actuator 31 of the second disk guide arm 12 turns on the first switch 108 and also turns on the second switch 109. The control for the pivotal movement of the first and second disk guide arms 11 and 12 is different from that of the case of the 8 cm disk 7. That is, the pin 32 of the second disk guide arm 12 is controlled by the two cam faces 88a and 88b, thereby controlling the pivotal movement of the first and second disk guide arms 11 and 12.

Figure 19:
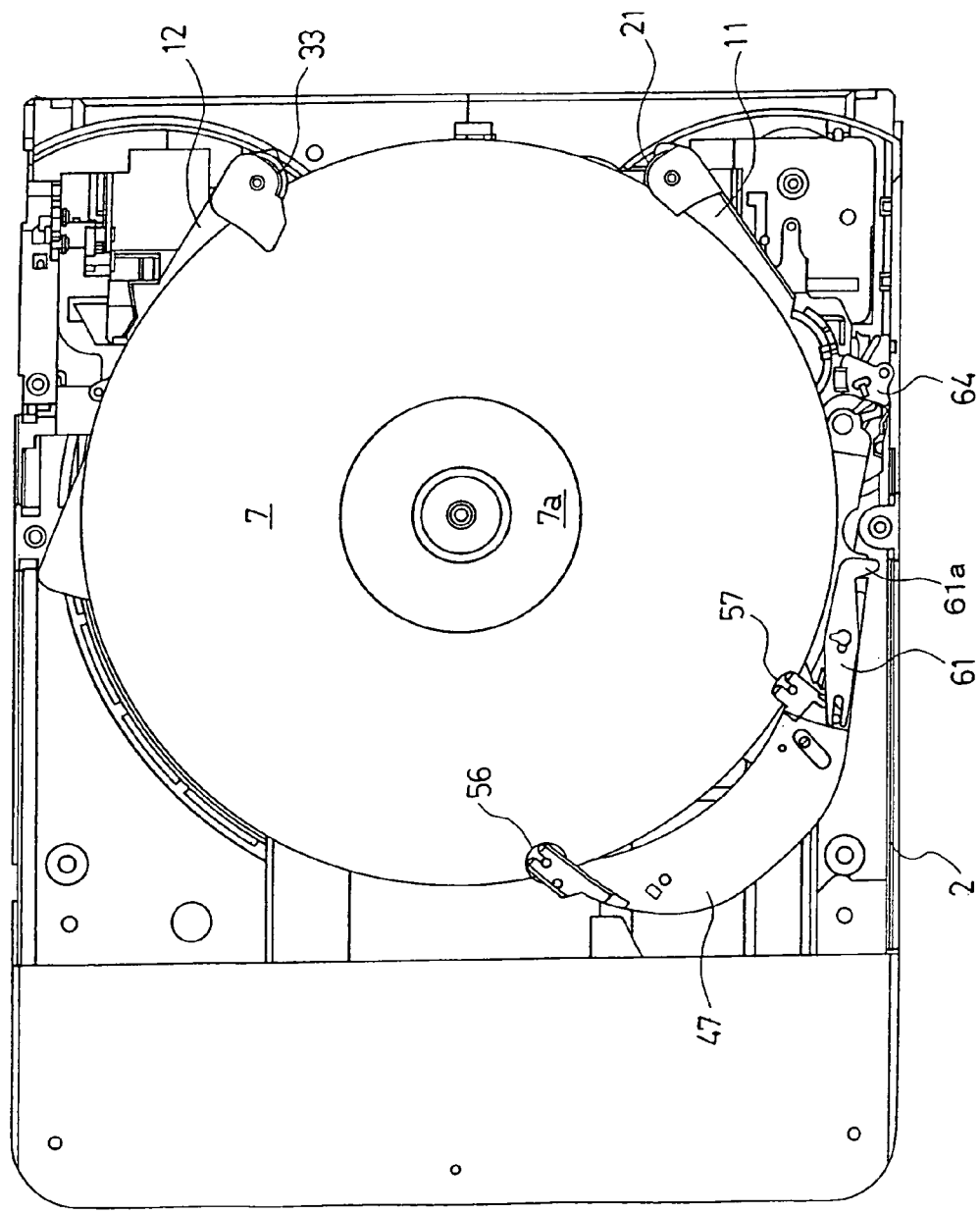
FIG. 19 is a plan view showing a state where a large-diameter disk of 12 cm in diameter is centered.

In FIG. 3, the periphery of the 12 cm disk 7 inserted into the disk storage medium processing apparatus 1 comes in contact with the disk holding roller 56 of the disk holding arm 44 and moves the disk holding arm 44 to pivot in the counter-clockwise direction similarly to the case of the 8 cm disk 7. As the amount of the pivotal movement of the disk holding arm 44 increases, the disk holding roller 57 also comes in contact with the periphery of the 12 cm disk 7, whereby the periphery of the 12 cm disk 7 is held by the disk driving roller 21, the disk guide portion 33, and the disk holding rollers 56 and 57 so as to hold the 12 cm disk 7 similarly to the case of the 8 cm disk 7. According to the further movement of the disk holding arm 44 in the counter-clockwise direction, the holding assist arm 47 pivots relative to the holding arm body 45, whereby the 12 cm disk 7 is set to the centering position with maintaining the periphery of the disk 7 to be held by the disk driving roller 21, the disk guide portion 33, and the disk holding rollers 56 and 57 as shown in FIG. 19.

Figure 20:
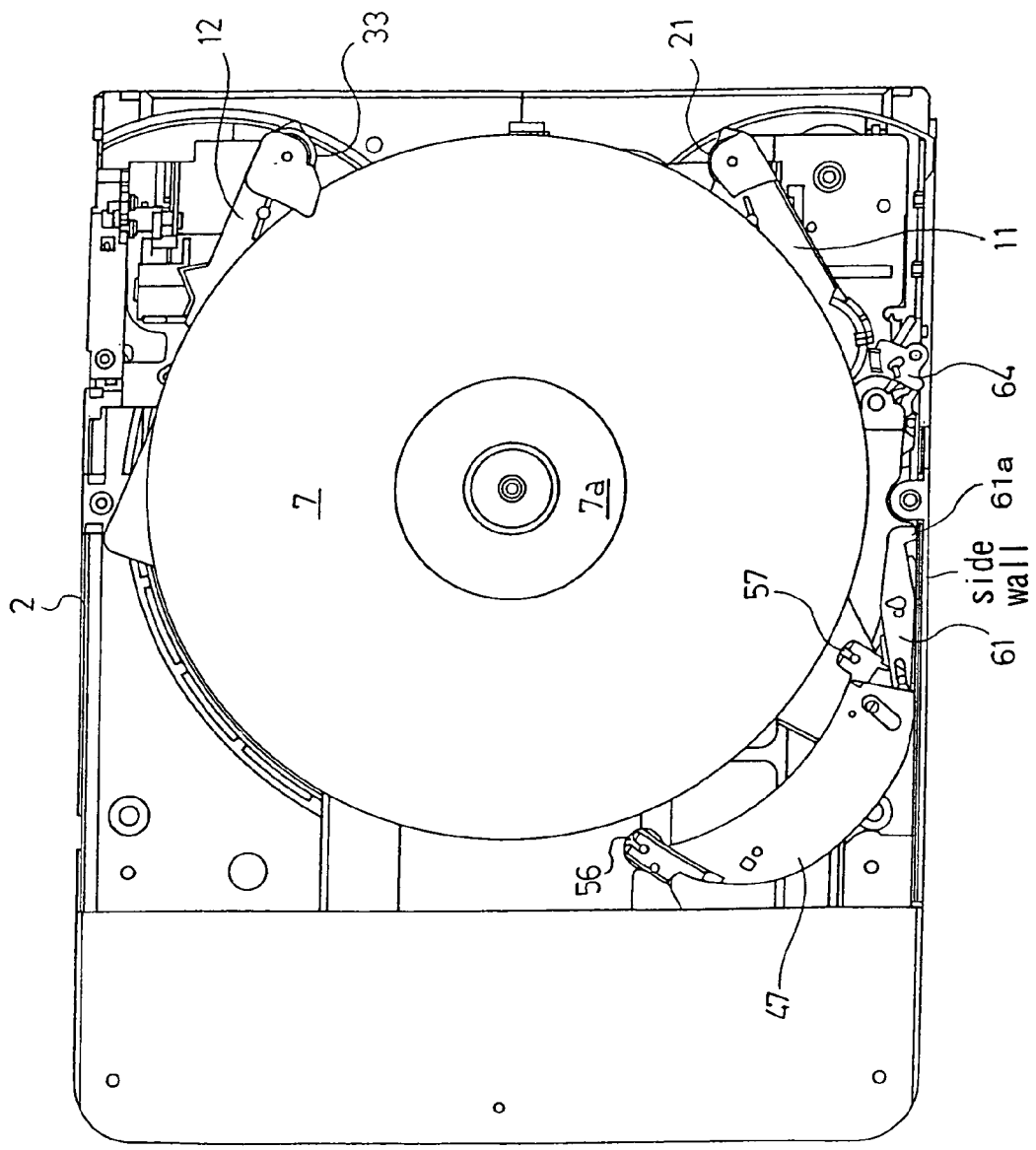
FIG. 20 is a plan view showing a state where the holding of the large-diameter disk of 12 cm in diameter which is centered is released.

Because of the movement of the slide cam member 81 from the centering of the 12 cm disk 7 to the clamping of the 12 cm disk 7 similarly to the aforementioned case of the 8 cm disk, the disk holding arm 44 further pivots in the counter-clockwise direction. Accordingly, the pressed portion 61a of the switching lever 61 comes in contact with the side wall of the apparatus body 2 as shown in FIG. 20 so that the switching lever 61 is moved to pivot in the counter-clockwise direction. Therefore, the holding assist arm 47 pivots relative to the holding arm body 45 so that the relation between the holding assist arm 47 and the holding arm body 45 becomes to the state shown by chain double-dashed lines in FIG. 7(b). Accordingly, the pivotal movement of the disk holding arm 44 takes small space even when the disk holding arm 44 pivots largely. In the state that the 12 cm disk 7 is clamped by the turn table 117 of the traverse unit 4, the disk driving roller 21, the disk guide portion 33, the disk holding roller 56 and 57, and the pin 106 are spaced apart from the disk 7 so that the 12 cm disk is freely rotatable. Similarly to the aforementioned case of inserting the disk 7, when the 12 cm disk is taken out, the periphery of the disk 7 is sandwiched and held between the slant face 6b and the horizontal face 6h of the disk holding portion 6j, near the second disk guide arm 12, of the disk loading/unloading slot 6 because of the difference in biasing force of the first and second disk guide arms 11 and 12. Since the disk 7 is held in this manner, the attitude of the disk 7 can be maintained to extend along the ejection direction. Therefore, the disk 7 which is partially out of the apparatus body through the disk loading/unloading slot 6 can be held in further stable attitude. The assist lever 105 is not necessarily provided and can be omitted. In this case, the disk driving roller 21, and the disk guide portion 33, and the two disk holding rollers 56 and 57 are adapted to hold the 8 cm disk 7 at four points stably.

In the disk storage medium processing apparatus 1 of this embodiment having the aforementioned structure, the disk 7 is conveyed between the disk loading/unloading slot 6 and the turn table 117 of the traverse unit 4 while holding the periphery of the disk 7 by the pair of the first and second disk guide arms 11 and 12. Therefore, the disk storage medium processing apparatus 1 can protect the recording surface of the disk 7 from damage or foreign matters such as dust, allows the simplification of the structure for conveying the disk 7, and allows reduction in size of the apparatus.

Since the first disk guide aim 11 has the disk driving roller 21 for conveying the disk 7 and the gear train 22 for transmitting power to rotate the disk driving roller 21 is placed on the first disk guide arm 11, the power of the driving motor 37 can be securely transmitted to the disk driving roller 21 even when the first disk guide arm 11 pivots. In addition, the efficient use of the first disk guide arm 11 eliminates the need for a space for mounting the gear train 22 onto the apparatus body 2. This allows reduction in size of the apparatus.

The first disk guide arm 11 has the disk driving roller 21 for holding the periphery of the disk 7 and the second disk guide arm 12 has the disk guide portion 33, made of an elastic friction material, for holding the periphery of the disk 7, thereby eliminating the need for a roller on the second disk guide arm 12. This allows the simplification of the disk holding structure of the second disk guide arm 12. Since the disk guide portion 33 has the linear holding portions 35a and 35b, the disk 7 can be stably held when unloading the disk 7, thereby facilitating the unloading of the disk 7.

Since the pivotal movement of the first and second disk guide arms 11 and 12 are synchronized by the arm synchronous member 98, conveying control of the disk 7 can be securely and easily conducted such that the disk 7 can be conveyed from the disk loading/unloading slot 6 to the centering position of the traverse unit 4 and can be conveyed from the centering position of the traverse unit 4 to the disk loading/unloading slot 6 without leaning the disk 7 within the apparatus body 2.

Further, the first disk guide arm 11 has the cam 16 for discriminating the diameter of the disk 7 and controlling the conveyance of the disk 7 according to the diameter of the disk 7, thereby eliminating the need for another means for discriminating the diameter of the disk 7. Therefore, this can reduce the number of parts and eliminate the need for a space of mounting the means on the apparatus body, thereby allowing reduction in size of the apparatus.

Since the disk holding arm 44 has a foldable structure composed of the holding arm body 45 and the holding assist arm 47, the disk holding arm 44 achieves reliable holding of either of the large-diameter 12 cm disk and the small-diameter 8 cm disk and reduces its radius of gyration, thereby further allowing reduction in size of the apparatus. Since the disk holding arm 44 can hold the small-diameter 8 cm disk at least at two points by the holding assist arm 47, even the small-diameter disk can be reliably held. In addition, the disk holding arm 44 enables more reliable and easier centering of either of the large-diameter 12 cm disk and the small-diameter 8 cm disk.

Respective trigger for starting the conveyance of the large-diameter 12 cm disk and the small-diameter 8 cm disk is set according to the amount of pivotal movement of the disk holding arm 44, thereby easily and flexibly responding the disk whether the disk has the small diameter or the large diameter and thus constantly and easily conducting the control for conveyance of the disk 7 of either diameter.

A plurality of controls such as the control for conveyance of the disk 7, the control for centering of the disk 7, control for clamping or unclamping the disk 7 relative to the turn table 117, the control for opening or closing the shutter 8, and the ON/OFF control for the third switch 110 are conducted by only one control member, i.e., the slide cam member 81, regardless of the diameter of the disk 7, thereby eliminating the need for respective control members for conducting these controls and thus reducing the number of parts. In addition, it facilitates these controls and thus improves the controllability. Moreover, it can eliminate the need for spaces for mounting the respective control members on the apparatus body 2, thereby allowing reduction in size of the apparatus.

Since the traverse unit 4 is supported by the traverse unit supporting member 115 and the disk 7 can be clamped with the traverse unit 4 just by moving the traverse unit supporting member 115 to pivot, no design change is required even if a conventional traverse unit is used as the traverse unit 4 for the disk storage medium processing apparatus 1 of this embodiment. Therefore, an existing traverse unit can be used as the traverse unit 4 without design change, thereby easily producing the disk storage medium processing apparatus 1 at low cost.

Since the disk 7 is pinched and held by at least the disk driving roller 21, the disk guide portion 33, and the disk holding roller 56, the disk storage medium processing apparatus 1 is allowed to be installed freely in any of a horizontal attitude, a vertical attitude, and an inclined attitude.

Figure 21:
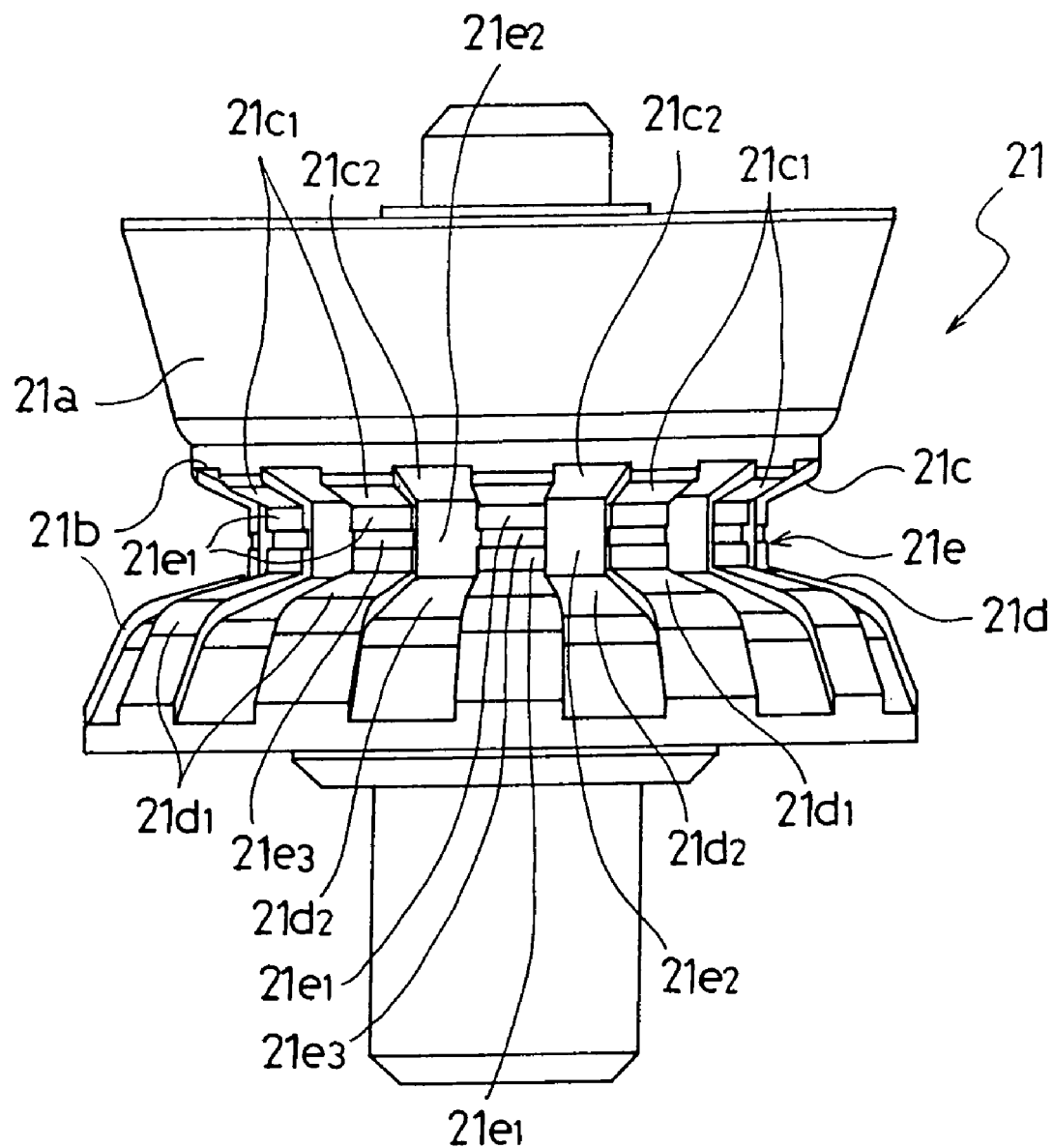
FIG. 21 is an illustration showing a disk driving roller in another embodiment of the disk storage medium processing apparatus according to the present invention.

FIG. 21 is an illustration showing another embodiment of the disk storage medium processing apparatus according to the present invention.

As shown in FIG. 21, in a disk storage medium processing apparatus 1 of this embodiment, a pair of pinching surfaces 21$c$, 21$d$ of a disk pinching portion 21$b$ of a disk driving roller 21 are composed of convexities 21$c_1$, 21$d_1$ and concavities 21$c_2$, 21$d_2$ which are alternately arranged in the circumferential direction to form uneven conical surfaces, respectively. In this embodiment, each pair of the convexities 21$c_1$ and 21$d_1$ are continued in the axial direction through a convexity 21$e_1$ of the bottom surface 21$e$ as the boundary between the pinching surfaces 21$c$ and 21$d$, while each pair of the concavities 21$c_2$ and 21$d_2$ are continued in the axial direction through a concavity 21$e_2$ of the bottom surface 21$e$ as the boundary between the pinching surfaces 21$c$ and 21$d$ similarly. In each convexity 21$e_1$ of the bottom surface 21$e$, there is formed a circumferential groove 21$e_3$ which is flush with the concavity 21$e_2$. That is, the disk driving roller 21 is provided with a pinching groove for sandwiching the periphery of the disk 7 from above and below by the pair of the pinching surfaces 21$c$ and 21$d$. In this regard, the periphery of the disk 7 is held by the convexities 21$c_1$ and 21$d_1$ of the pinching surfaces 21$c$ and 21$d$ from above and below, but not held by the concavities 21$c_2$ and 21$d_2$. Therefore, the pair of the pinching surfaces 21$c$, 21$d$ sandwich the periphery of the disk 7 intermittently.

Because of the convexities 21$c_1$, 21$d_1$ and the concavities 21$c_2$, 21$d_2$, the disk 7 is held by the pairs of convexities 21$c_1$ and 21$d_1$ intermittently and the disk 7 is held by edges of the convexities 21$c_1$ and 21$d_1$ intermittently, thereby transmitting larger driving force from the disk driving roller 21 to the disk 7 and thus further ensuring the loading and the unloading of the disk 7.

It should be understood that the circular pinching groove of the first guide holding portion 34 and the linear pinching groove of the linear guide holding portion 35 shown in FIG. 5 may be provided with convexities and concavities similar to the convexities 21$c_1$, 21$d_1$ and the concavities 21$c_2$, 21$d_2$ of the disk driving roller 21 as mentioned above.

Figure 22:
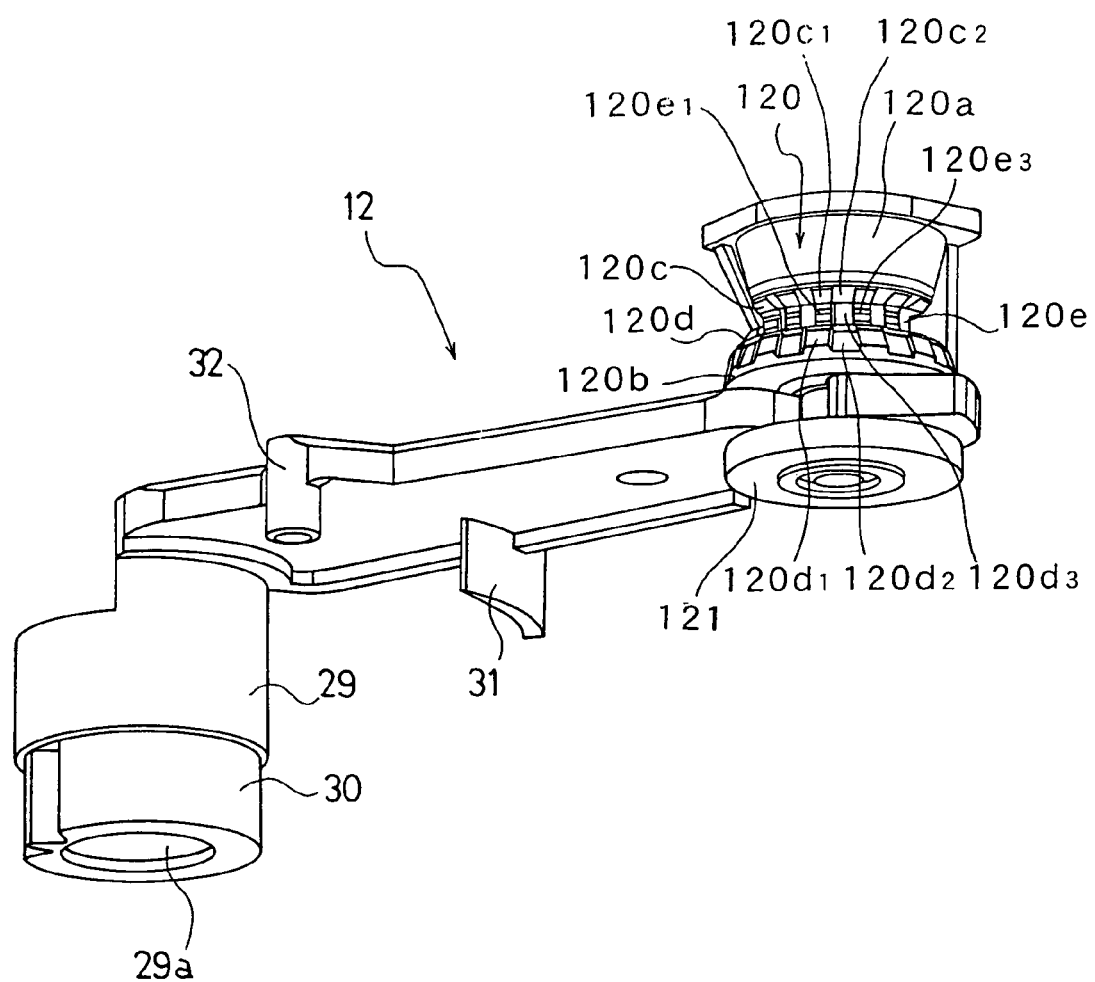
FIG. 22 is a perspective view showing a second disk guide arm of the embodiment shown in FIG. 21.

In the aforementioned embodiment, the disk guide portion 33 is disposed on the other end side of the second disk guide arm 12. In this embodiment, instead of the disk guide portion 33, a disk driven roller 120 is disposed which is rotatable relative to the second disk guide arm 12 as shown in FIG. 22. The disk driven roller 120 has completely the same configuration as that of the disk driving roller 21. The disk driven roller 120 has a disk guide portion 120$a$, a disk pinching portion 120$b$, a pair of pinching surfaces 120$c$ and 120$d$, convexities 120$c_1$ and 120$d_1$, concavities 120$c_2$ and 120$d_2$, a bottom surface 120$e$, convexities 120$e_1$, concavities 120$e_2$, and grooves 120$e_3$ which are corresponding to the disk guide portion 21$a$, the disk pinching portion 21$b$, a pair of the pinching surfaces 21$c$ and 21$d$ which can come in contact with the upper and lower edges of the periphery of the disk 7, the convexities 21$c_1$ and 21$d_1$, the concavities 21$c_2$ and 21$d_2$, the bottom surface 21$e$, the convexities 21$e_1$, the concavities 21$e_2$, and the grooves 21$e_3$ of the disk driving roller 21. That is, the disk driven roller 120 is provided with a pinching groove for sandwiching the periphery of the disk 7 from above and below by the pair of the pinching surfaces 120$c$ and 120$d$. In this regard, the periphery of the disk 7 is held by the convexities 120$c_1$ and 120$d_1$ of the pair of pinching surfaces 120$c$ and 120$d$ from above and below, but not held by the concavities 120$c_2$ and 120$d_2$. Therefore, the pair of the pinching surfaces 120$c$, 120$d$ sandwich the periphery of the disk 7 intermittently.

Figure 23:
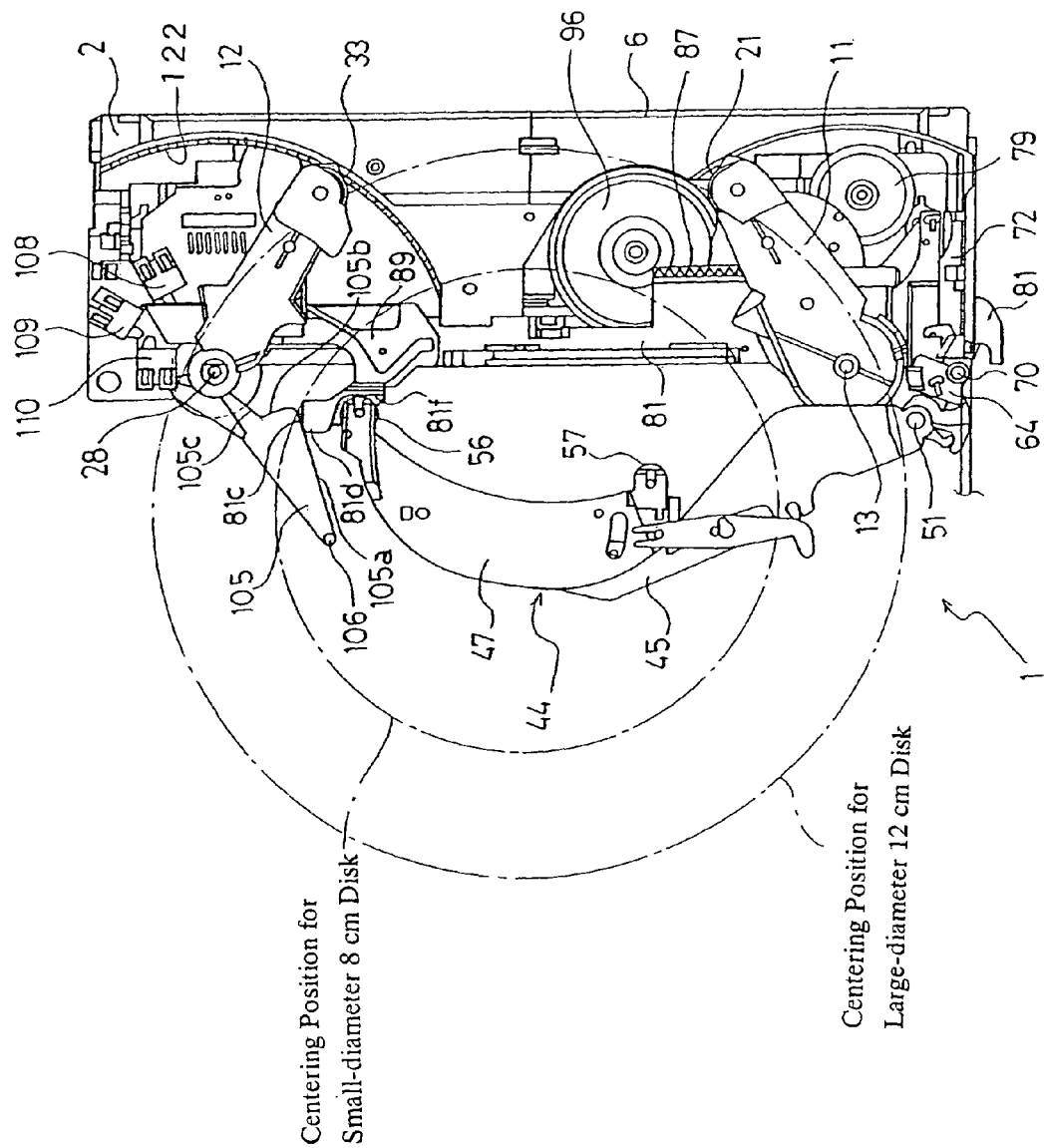
FIG. 23 is a plan view (top view) similar to FIG. 3, but partially showing the disk storage medium processing apparatus in its non-operational state without an upper cover of an apparatus body of the embodiment shown in FIG. 21.

Further, a driven gear 121 is disposed coaxially with the driven roller 120 such that the driven gear 121 can rotate together with the driven roller 120. On the other hand, in the apparatus body 2, there is provided a rack gear 122 having circular arc shape internal teeth. The rack gear 122 is formed into an arc of a circle about the rotary shaft 28 of the second disk guide arm 12. The driven gear 121 always meshes with the rack gear 122. Therefore, when the second disk guide arm 12 is moved to pivot in the clockwise direction when seen in FIG. 23, the driven gear 121 and the disk driven roller 120 both rotate in the counter-clockwise direction. When the second disk guide arm 12 is moved to pivot in the counter-clockwise direction when seen in FIG. 23, the driven gear 121 and the disk driven roller 120 both rotate in the clockwise direction.

The other structure of the disk storage medium processing apparatus 1 of this embodiment is the same as that of the disk storage medium processing apparatus 1 of the aforementioned embodiment.

In the disk storage medium processing apparatus 1 of this embodiment having the aforementioned structure, the disk driving roller 21 for holding the periphery of the disk 7 is rotatably disposed on the first disk guide arm 11 and the disk driven roller 120 having completely the same configuration as that of the disk driving roller 21 is rotatably disposed on the second disk guide arm 12, whereby the loading and the unloading of the disk 7 can be smoothly and stably conducted such that the center of the disk 7 moves along substantially the midpoint between the disk driving roller 21 and the disk driven roller 120 with little rotation of the disk 7 in the initial stage of the loading. Therefore, the user feels comfortable when inserting the disk through the disk loading/unloading slot 6. Since completely the same rollers are used in the first and second disk guide arm 11 and 12 so as to eliminate the need to use rollers of different configurations as the disk driving roller 21 and the disk driven roller 120, thereby reducing the cost because of commonization of parts.

When the user inserts the disk 7 through the disk loading/unloading slot 6 and the upper and lower edges of the periphery of the disk 7 comes in contact with the disk driving roller 21, large driving force is generated between the disk driving roller 21 and the disk 7 because the disk driving roller 21 has the convexities and concavities $21c_1$, $21d_1$; $21c_2$, $21d_2$. Therefore, the first and second disk guide arms 11 and 12 are reliably moved to pivot in the opening directions.

The other works and effects of the disk storage medium processing apparatus 1 of this embodiment are the same as the works and effects of the disk storage medium processing apparatus 1 of the aforementioned embodiment.

In the aforementioned embodiment shown in FIG. 21 and FIG. 22, the pair of the pinching surfaces 21c, 21d; 120c, 120d and the bottom surfaces 21e, 120e are provided with the convexities $21c_1$, $21d_1$; $120c_1$, $120d_1$; $21e_1$, $120e_1$, the concavities $21c_2$, $21d_2$; $120c_2$, $120d_2$; $21e_2$, $120e_2$, and the grooves $21e_3$, $120e_3$, respectively so that the pinching surfaces 21c, 21d; 120c, 120d and the bottom surfaces 21e, 120e are formed in uneven surfaces. However, these are not necessarily formed. For example, the disk guide portion 21a, the disk pinching portion 21b, the pair of the pinching surfaces 21c, 21d, and the bottom surface 21e of the disk driving roller 21 may be formed in a continuous surface without convexities and concavities as shown in FIG. 4(a). The same is true of the disk driven roller 120.

The disk driving roller 21 and the disk driven roller 120 rotate in the state that the periphery of the disk 7 is sandwiched from above and below by the pair of the pinching surfaces 21c, 21d; 120c, 120d at the pinching grooves of the disk pinching portions 21b, 120b, thereby drawing or ejecting the disk 7.

Though the pair of the pinching surfaces 21c, 21d and the bottom surface 21e of the disk driving roller 21 are formed in a continuous surface without convexities and concavities in the aforementioned embodiment shown in FIG. 4(a), convexities $21c_1$, $21d_1$, $21e_1$, concavities $21c_2$, $21d_2$, $21e_2$, and grooves $21e_3$ similar to those in the embodiment shown in FIG. 21 may be formed in the pinching surfaces 21c, 21d and the bottom surface 21e so that the pinching surfaces 21c, 21d and the bottom surface 21e may be formed in an uneven surface.

Figure 24:
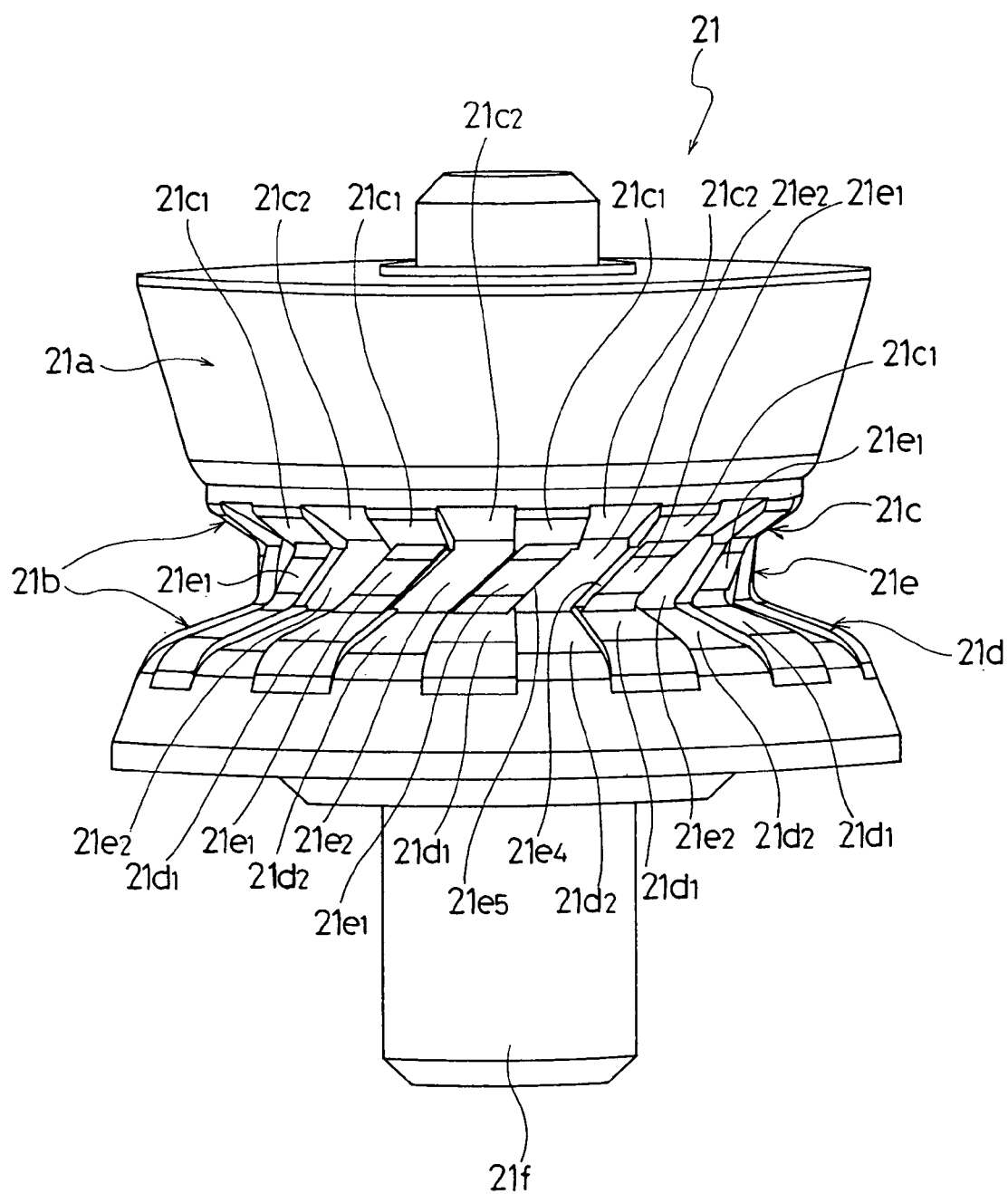
FIG. 24 is an illustration similar to FIG. 21, but showing a disk driving roller of further another embodiment of the disk storage medium processing apparatus according to the present invention.

FIG. 24 is a perspective view showing a disk driving roller of another embodiment of the disk storage medium processing apparatus according to the present invention.

In the aforementioned embodiment, the circumferential phases of the convexities $21c_1$, $21d_1$ of the pinching surfaces 21c, 21d of the disk driving roller 21 coincide with each other (i.e., there is no phase difference) and the circumferential phases of the concavities $21c_2$, $21d_2$ of the pinching surfaces 21c, 21d coincide with each other (i.e., there is no phase difference) so that the convexities $21e_1$ of the bottom surface 21e connecting the concavities $21c_1$ and $21d_1$ to each other and the concavities $21e_2$ of the bottom surface 21e connecting the concavities $21c_2$ and $21d_2$ are formed parallel to a rotary shaft 21f of the disk driving roller 21. However, in the disk driving roller 21 in the disk storage medium processing apparatus 1 of this embodiment as shown in FIG. 24, the circumferential phases of convexities $21c_1$, $21d_1$ of the pinching surfaces 21c, 21d are different from each other (i.e., there is phase difference) and the circumferential phases of concavities $21c_2$, $21d_2$ of the pinching surfaces 21c, 21d are different from each other (i.e., there is phase difference). That is, the circumferential phases of the convexities $21d_1$ and the concavities $21d_2$ of the pinching surface 21d are advanced a predetermined amount in the clockwise direction (i.e., in a right-to-left direction when seen in FIG. 24) from the circumferential phases of the convexities $21c_1$ and the concavities $21c_2$ of the pinching surface 21c.

The convexities $21e_1$ of the bottom surface 21e connecting the convexities $21c_1$, $21d_1$ to each other and the concavities $21e_2$ of the bottom surface 21e are each formed to extend diagonally not parallel to the rotary shaft 21f of the disk driving roller 21.

The other structure of the disk storage medium processing apparatus 1 of this embodiment is the same as that of the aforementioned embodiment.

In the disk storage medium processing apparatus 1 of this embodiment having the aforementioned structure, the convexities $21c_1$, $21d_1$ of the disk pinching portion 21b are elastically deformed when the periphery of the disk 7 is sandwiched from above and below by the convexities $21c_1$, $21d_1$ of the pinching surfaces 21c, 21d because the disk pinching portion 21b is made of elastic material such as rubber. Because of the elastic deformation of the convexities $21c_1$, $21d_1$, the peripheral surface of the disk 7 comes in contact with the convexities $21e_1$ of the bottom surface 21e. Since the convexities $21e_1$ and the concavities $21e_2$ of the bottom surface 21e extend diagonally relative to the rotary shaft 21f, the disk 7 is pressed toward the pinching surface 21c by boundary edges $21e_4$ between the convexities $21e_1$ and the concavities $21e_2$ when the disk driving roller 21 rotates in the clockwise direction, and the disk 7 is pressed toward the pinching surface 21d by boundary edges $21e_5$ between the convexities $21e_1$ and the concavities $21e_2$ when the disk driving roller 21 rotates in the counter-clockwise direction. As mentioned above, when the disk driving roller 21 rotates, the disk is pressed toward either of the pinching surfaces 21c, 21d by either of the boundary edges $21e_4$, $21e_5$ between the convexities $21e_1$ and the concavities $21e_2$ of the bottom surface 21e according to the rotational direction of the disk driving roller 21. Therefore, the driving force from the disk driving roller 21 to the disk 7 is increased, thereby further reliably conducting the conveyance of the disk 7.

Though the circumferential phases of the convexities $21d_1$ and the concavities $21d_2$ are advanced a predetermined amount in the clockwise direction from the circumferential phases of the convexities $21c_1$ and the concavities $21c_2$ in the embodiment shown in FIG. 24, the circumferential phases of the convexities $21c_1$ and the concavities $21c_2$ may be advanced a predetermined amount in the clockwise direction from the circumferential phases of the convexities $21d_1$ and the concavities $21d_2$.

In the disk driven roller 33, convexities $33c_1$, $33d_1$, $33e_1$ and the concavities $33c_2$, $33d_2$, $33e_2$ may be formed similarly to the convexities $21c_1$, $21d_1$, $21e_1$ and the concavities $21c_2$, $21d_2$, $21e_2$. In this case, the phase difference between the convexities $33c_1$ and $33d_1$ and the phase difference between the concavities $33c_2$ and $33c_2$ are set in such a manner that when the disk 7 is pressed to one of the pinching surfaces 21c, 21d according to the rotation of the disk driving roller 21, the disk 7 is pressed to one of the pinching surfaces 33c, 33d which is on the same side of the pinching surface of the disk driving roller 21.

What I claim is:

1. A disk storage medium processing apparatus comprising:
   an apparatus body having a disk loading/unloading slot;
   a traverse unit which is disposed in said apparatus body to conduct at least one of recording, deletion, and reproduction of information onto or from a disk; and
   a disk conveying means which conveys said disk into said apparatus body when a part of said disk is inserted through said disk loading/unloading slot and which ejects a part of said disk through said disk loading/unloading slot from a state that said disk is housed in said apparatus body, wherein said disk conveying means comprises at least a pair of first and second disk conveying arms which are pivotably attached to the apparatus body and which can hold the periphery of said disk to convey said disk, said first and second disk conveying arms being arranged to pivot in opposite directions with respect to each other when conveying the disk;
   wherein said first and second disk conveying arms are adapted to hold a periphery of said disk to convey said disk to said traverse unit when a part of said disk is inserted through said disk loading/unloading slot and are adapted to hold the periphery of said disk to convey said disk from said traverse unit to eject a part of said disk through said disk loading/unloading slot,
   wherein said first disk conveying arm is provided with a disk driving roller which can hold the periphery of said disk and rotate in directions of withdrawing said disk and of ejecting said disk, and said second disk conveying arm is provided with a disk guide portion which is made of friction material and which can hold the periphery of said disk,
   wherein said first disk conveying arm is always biased in such a direction that said disk driving roller comes closer to said disk guide portion of said second disk conveying arm and said second disk conveying arm is always biased in such a direction that said disk guide portion comes closer to said disk driving roller, and
   wherein the biasing force biasing said first disk conveying arm is set to be more than the biasing force biasing said second disk conveying arm.

2. A disk storage medium processing apparatus as claimed in claim 1, wherein a clamping portion capable of clamping the periphery of said disk is formed in said disk loading/unloading slot on said second disk conveying arm side.

3. A disk storage medium processing apparatus as claimed in claim 2, wherein a gear train for transmitting rotational force to said disk driving roller is arranged on said first disk conveying arm.

4. A disk storage medium processing apparatus as claimed in claim 1, further comprising an arm synchronous means for synchronizing the pivotal movement of said first disk conveying arm and the pivotal movement of said second disk conveying arm with each other.

5. A disk storage medium processing apparatus as claimed in claim 1, wherein said disk loading/unloading slot has a disk holding portion for holding said disk.

6. A disk storage medium processing apparatus as claimed in claim 1, wherein the disk driving roller comprises a disk guide portion which comprises an inverted truncated cone having a guide surface for guiding the upper peripheral edge, and a disk pinching portion which is fixed to the disk guide portion to rotate together with the disk guide portion having pinching surfaces composed of a pair of circular conical surfaces and a pinching groove for sandwiching the periphery of the disk from above and below.

7. A disk storage medium processing apparatus as claimed in claim 6, wherein the pair of pinching surfaces cooperate together to form a pinching groove and are both continuously curved circumferential surfaces.

* * * * *